(12) United States Patent
Hanai

(10) Patent No.: US 8,595,210 B2
(45) Date of Patent: Nov. 26, 2013

(54) SEARCH APPARATUS, SEARCH METHOD AND PROGRAM

(75) Inventor: Yuya Hanai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/343,210

(22) Filed: Jan. 4, 2012

(65) Prior Publication Data

US 2012/0179710 A1 Jul. 12, 2012

(30) Foreign Application Priority Data

Jan. 11, 2011 (JP) ................................. 2011-003005

(51) Int. Cl.
*G06F 17/30* (2006.01)

(52) U.S. Cl.
USPC .......................................... 707/708; 707/723

(58) Field of Classification Search
USPC ................................................. 707/708, 723
See application file for complete search history.

(56) References Cited

U.S. PATENT DOCUMENTS

| | | | |
|---|---|---|---|
| 7,133,864 B2 * | 11/2006 | Roth .............................. | 707/708 |
| 7,216,116 B1 * | 5/2007 | Nilsson et al. ........................ | 1/1 |
| 7,246,113 B2 * | 7/2007 | Cheetham et al. ............ | 707/741 |
| 7,536,413 B1 * | 5/2009 | Mohan et al. .......................... | 1/1 |
| 7,827,164 B2 * | 11/2010 | Stevenson ..................... | 707/708 |
| 7,831,559 B1 * | 11/2010 | Mohan et al. .................. | 707/638 |
| 7,844,590 B1 * | 11/2010 | Zwicky et al. ................ | 707/706 |
| 7,844,599 B2 * | 11/2010 | Kasperski et al. ............ | 707/713 |
| 7,890,514 B1 * | 2/2011 | Mohan et al. .................. | 707/748 |
| 8,055,605 B2 * | 11/2011 | Foulger et al. .................. | 706/50 |

FOREIGN PATENT DOCUMENTS

JP 2002-024212 A 1/2002

* cited by examiner

*Primary Examiner* — Kim Nguyen

(74) *Attorney, Agent, or Firm* — Wolf, Greenfield & Sacks, P.C.

(57) ABSTRACT

Techniques are disclosed for performing a search based on a search query comprising at least one or more subjective elements and one or more objective elements. A first search for content may be performed based on the one or more objective elements of the search query. A distribution of a numerical characteristic of results returned from the first search may be determined, where the numerical characteristic corresponds to one of the subjective elements of the search query. One or more proportional threshold for the subjective element may be determined, and a range of the numerical characteristic may be selected by applying the one or more proportional thresholds to the distribution. A second search for content may be performed based on the selected range of the numerical characteristic.

16 Claims, 21 Drawing Sheets

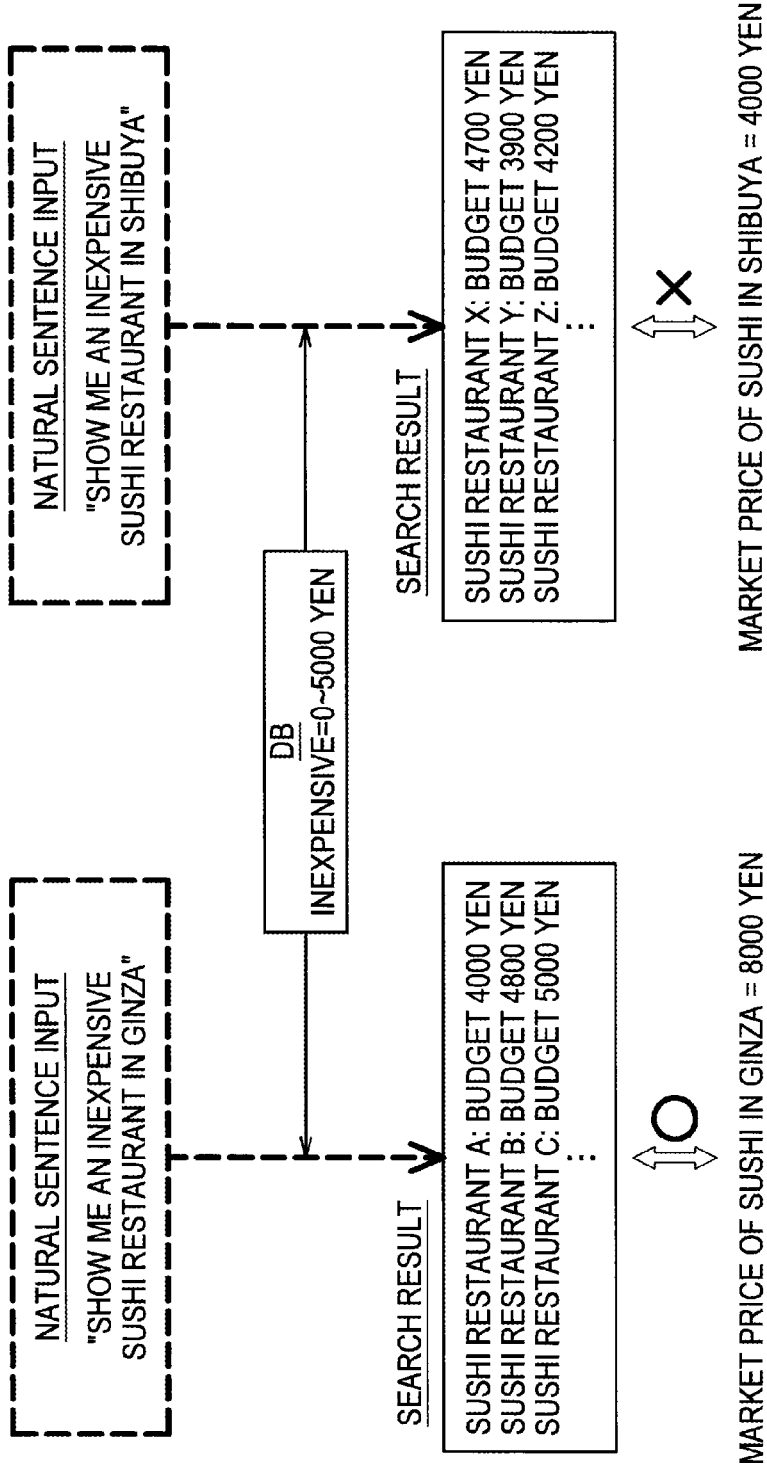

FIG.3

(SUBJECT #2: IF FINE COMBINATION IS MANAGED WITH DB, DB BECOME INSUBSTANTIALLY LARGE

EXAMPLE OF DB

| PLACE | SUBJECTIVE REPRESENTATION | TARGET ELEMENT | NUMERICAL RANGE |
|---|---|---|---|
| GINZA | INEXPENSIVE | SUSHI RESTAURANT | 0~7000 YEN |
| SHIBUYA | INEXPENSIVE | SUSHI RESTAURANT | 0~3000 YEN |
| SHINJUKU | INEXPENSIVE | SUSHI RESTAURANT | 0~3500 YEN |
| SHINAGAWA | INEXPENSIVE | SUSHI RESTAURANT | 0~4000 YEN |
| NERIMA | INEXPENSIVE | SUSHI RESTAURANT | 0~2800 YEN |
| ... | ... | ... | ... |

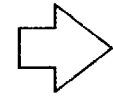

LARGE SIZE OF DB!!
→ DEGRADE SEARCH EFFICIENCY AND INCREASE COST
→ PERSONALIZATION IS DIFFICULT

FIG.5

EXAMPLE OF QUERY GENERATION DICTIONARY DB

| WORD REPRESENTATION | PARTS OF SPEECH/ATTRIBUTE | CLASSIFICATION | SUBJECTIVE REPRESENTATION |
|---|---|---|---|
| VERY INEXPENSIVE | | PRICE | VERY INEXPENSIVE |
| INEXPENSIVE | | PRICE | INEXPENSIVE |
| ... | | ... | ... |
| HIGH LEVEL | | PRICE | EXPENSIVE |
| ... | | ... | ... |
| * | PROPER NOUN: NAME OF PLACE | PLACE | * |

FIG.6

EXAMPLE OF STANDARD RELATIVE VALUE DB

| CLASSIFICATION | SUBJECTIVE REPRESENTATION | RELATIVE VALUE | NUMERICAL RANGE FOR INTERIM QUERY |
|---|---|---|---|
| PRICE | VERY INEXPENSIVE | [0%, 10%] | - |
| | INEXPENSIVE | [0%, 30%] | - |
| | EXPENSIVE | [70%, 100%] | - |
| EVALUATION | EVALUATION IS HIGH | [0%, 35%] | 3.0 OR MORE |
| | COOK IS GOOD | [0%, 35%] | 3.0 OR MORE |
| | SERVICE IS GOOD | [0%, 35%] | 3.0 OR MORE |

FIG.7

EXAMPLE OF PERSONAL RELATIVE VALUE DB

| USER ID | CLASSIFICATION | SUBJECTIVE REPRESENTATION | RELATIVE VALUE | WEIGHT VALUE |
|---|---|---|---|---|
| A | PRICE | INEXPENSIVE | [0%, 23%] | 160 |
| A | PRICE | EXPENSIVE | [51%, 100%] | 160 |
| A | EVALUATION | EVALUATION IS HIGH | [0%, 40%] | 127 |
| B | PRICE | VERY INEXPENSIVE | [0%, 5%] | 175 |
| B | EVALUATION | EVALUATION IS HIGH | [0%, 25%] | 80 |
| B | EVALUATION | COOK IS GOOD | [0%, 36%] | 80 |
| B | EVALUATION | SERVICE IS GOOD | [0%, 41%] | 80 |
| C | EVALUATION | SERVICE IS GOOD | [0%, 35%] | 110 |

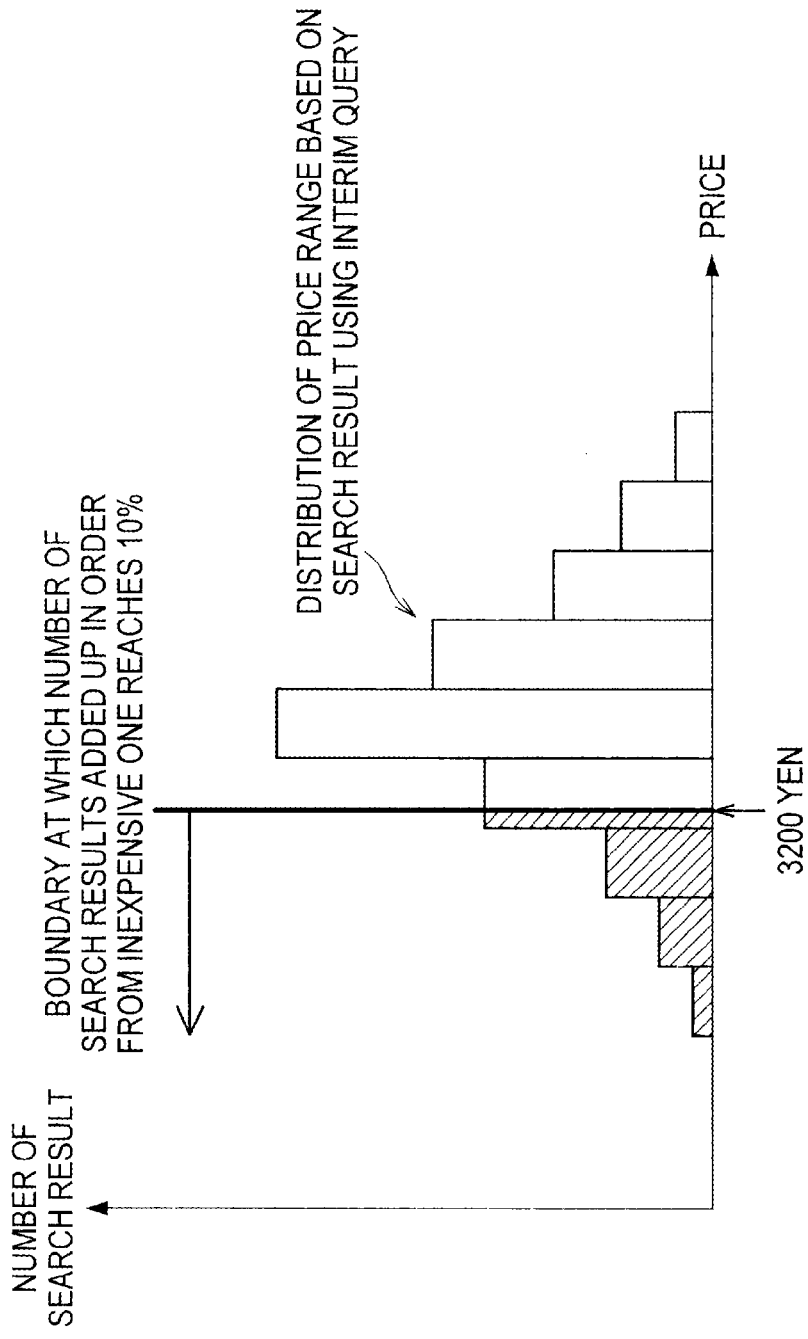

FIG.9

EXAMPLE OF SEARCH RESULT BASED ON INTERIM QUERY AND DIGITALIZING METHOD

| SHOP NAME | ADDRESS | BUDGET | EVALUATION |
|---|---|---|---|
| X SUSHI, GINZA HEAD SHOP | X-XX-1, GINZA, CHUO-KU, TOKYO | 3000 | 3.3 |
| X SUSHI, GINZA 2CHOME SHOP | 2-XX-X, GINZA, CHUO-KU, TOKYO | 3800 | 3.0 |
| Y SUSHI | 1-11-X, GINZA, CHUO-KU, TOKYO | 4000 | 3.0 |
| Z SUSHI | X-1X-7, GINZA, CHUO-KU, TOKYO | 4500 | 3.4 |
| EDOMAE SUSHI DAMASUSHI | 3-XX-9, GINZA, CHUO-KU, TOKYO | 4500 | 3.1 |
| YANAGI SUSHI HEAD SHOP | 5-XX-2, GINZA, CHUO-KU, TOKYO | 5500 | 3.4 |
| SUSHI GOTARO | X-11-1, GINZA, CHUO-KU, TOKYO | 6200 | 3.5 |
| SUSHI SOMEJIRO | 4-1-X, GINZA, CHUO-KU, TOKYO | 6800 | 3.5 |
| SUSHI KYUBEI | X-22-3, GINZA, CHUO-KU, TOKYO | 7800 | 3.8 |
| ... | ... | ... | ... |

← 23%
← 30%

EXAMPLE OF SEMANTIC CONCEPT DICTIONARY

FIG.18

EXAMPLE OF CONTENT METADATA DB

| SHOP STORE | ADDRESS | NEAREST STATION | (LATITUDE, LONGITUDE) | GENRE ID | GENRE NAME |
|---|---|---|---|---|---|
| KYOMACHIWASHOKU SHIBUYA SHOP | X-XX, DOUKENDAKA, SHIBUYA-KU, TOKYO | SHIBUYA | (35.66, 139.70) | G001 | JAPANESE FOOD |
| IJAKAYA TORANOSUKE | XX-XXX, SHINJUKU,SHINJUKU-KU, TOKYO | SHINJUKU | (35.69, 139.70) | G004 | WIINDE RESTAURANT |
| YOINOKUCHI IKEBUKURO SHOP | X-XX-X, IKEBUKURO, DOSHIMA-KU, TOKYO | IKEBUKURO | (35.73, 139.71) | G004 | WIINDE RESTAURANT |
| YAKINIKU SUMI | X-XX-X, GONAN, MINADO-KU, TOKYO | SHINAGAWA | (35.63, 139.74) | G008 | ROAST |
| ... | ... | ... | ... | ... | ... |

| COOK ID | COOK CLASSIFICATION | BUDGET ID | BUDGET AMOUNT | EVALUATION | NUMBER OF EVALUATING PERSONS |
|---|---|---|---|---|---|
| R001 | JAPANESE FOOD | B003 | 3001~4000 YEN | 3.1 | 21 |
| R004 | SKEWERED FOOD | B004 | 2001~3000 YEN | 2.8 | 11 |
| R006 | CASSEROLE | B002 | 4001~5000 YEN | 3.8 | 8 |
| R021 | ROAST | B002 | 4001~5000 YEN | 3.3 | 32 |
| ... | ... | ... | ... | ... | ... |

SEARCH APPARATUS, SEARCH METHOD AND PROGRAM

BACKGROUND

The present disclosure relates to a search apparatus, a search method, and a program.

In recent years, the possibility to search for various information, for example, using the Internet, has increased. For example, searches for transfer information of transportation facilities, information of a route to a destination, and the like are being routinely performed. Further, searches for shop information at a street or information of a ticket or a coupon using a portable device such as a portable telephone or a personal digital assistant are being routinely performed. Thus, recently, an information search chance has rapidly increased. Further, as users of information search services increase, an infrastructure of an information search system has been provided. As a result, recently, various information can be instantly searched, for example, using portable devices.

Assuming use of a portable device with which it is difficult to input search conditions, speech search service in which search conditions can be input through speech has been devised. Further, information search service in which a search condition can be input with a format of a natural sentence, "Show me a cheap sushi restaurant in Ginza," has also been devised. As a result, the search condition can be rapidly and simply input, thus greatly improving usability. However, in a number of information search services, even when subjective representations "cheap" and "good" are contained in a search condition, only information containing wordings "cheap" and "good" is extracted.

For example, even when search is performed using a natural sentence, "Show me a cheap sushi restaurant in Ginza," as a search condition, only sushi restaurant information containing the keyword "cheap" is extracted and information on some low-priced sushi restaurants may not necessarily be extracted. Thereby, a user desiring to obtain information on cheap sushi restaurants has to perform a search using a search condition containing a price range they consider cheap or has to confirm extracted information of sushi restaurants one by one and find the cheap sushi restaurants. As a solution to such a problem, a method in which a database with subjective representations associated with numerical ranges is prepared in advance and a subjective representation contained in a natural sentence input as a search condition is automatically converted into a numerical range to perform search is disclosed in Japanese Patent Laid-open Publication No. 2002-24212.

SUMMARY

If the method disclosed in Japanese Patent Laid-open Publication No. 2002-24212 is applied, it is certainly expected that search is performed with a condition close to a search condition desired to be designated using a subjective representation by a user, and a search result reflecting a user's intention is extracted. However, in this method, if a search condition other than the subjective representation is changed, a change of a numerical range desired to be designated using a subjective representation by the user is not considered. For example, a price range indicated by "cheap" in a search condition "Show me cheap sushi restaurants in Ginza" differs from a price range indicated by "cheap" in a search condition "Show me cheap soba restaurants in Ginza." However, in the method, the subjective representations "cheap" contained in the two search conditions is substituted with the same numerical range. Thereby, it is necessary for the user to perform a manipulation for designating a search condition again by referencing the search result.

The present disclosure has been devised to provide a search apparatus, a search method, and a program which are new and improved and capable of converting a subjective representation into a numerical range suitable for a user's intention according to content of a natural sentence containing the subjective representation.

Some embodiments relate to apparatus comprising at least one processor; and at least one memory storing processor-executable instructions configured to cause the at least one processor to receive a search query comprising at least one or more subjective elements and one or more objective elements, perform a first search for content based on the one or more objective elements, determine a distribution of a numerical characteristic of results returned from the first search, the numerical characteristic corresponding to a first subjective element of the one or more subjective elements, determine one or more proportional thresholds for the first subjective element, select a range of the numerical characteristic by applying the one or more proportional thresholds to the distribution, and perform a second search for content based on the selected range of the numerical characteristic.

Some embodiments relate to a method comprising receiving a search query comprising at least one or more subjective elements and one or more objective elements; performing a first search for content based on the one or more objective elements; determining, using at least one processor, a distribution of a numerical characteristic of results returned from the first search, the numerical characteristic corresponding to a first subjective element of the one or more subjective elements; determining one or more proportional thresholds for the first subjective element; selecting a range of the numerical characteristic by applying the one or more proportional thresholds to the distribution; and performing a second search for content based on the selected range of the numerical characteristic.

Some embodiments relate to at least one computer-readable storage medium encoded with computer-executable instructions that, when executed, perform a method comprising receiving a search query comprising at least one or more subjective elements and one or more objective elements; performing a first search for content based on the one or more objective elements; determining a distribution of a numerical characteristic of results returned from the first search, the numerical characteristic corresponding to a first subjective element of the one or more subjective elements; determining one or more proportional thresholds for the first subjective element; selecting a range of the numerical characteristic by applying the one or more proportional thresholds to the distribution; and performing a second search for content based on the selected range of the numerical characteristic.

Some embodiments relate to apparatus comprising means for receiving a search query comprising at least one or more subjective elements and one or more objective elements; means for performing a first search for content based on the one or more objective elements; means for determining a distribution of a numerical characteristic of results returned from the first search, the numerical characteristic corresponding to a first subjective element of the one or more subjective elements; means for determining one or more proportional thresholds for the first subjective element; means for selecting a range of the numerical characteristic by applying the one or more proportional thresholds to the distribution; and means for performing a second search for content based on the selected range of the numerical characteristic.

Some embodiments relate to apparatus comprising at least one processor; and at least one memory storing processor-executable instructions configured to cause the at least one processor to receive a search query comprising at least one or more subjective elements and one or more objective elements, display a range of a numerical characteristic of results returned from a first search for content based on the one or more objective elements, the numerical characteristic corresponding to a first subjective element of the one or more subjective elements, receive user input to modify the range of the numerical characteristic, and display results of a second search for content based on the modified range of the numerical characteristic.

BRIEF DESCRIPTION OF THE DRAWINGS

FIG. 2 is an illustrative diagram illustrating a problem of a general information search system.

FIG. 3 is an illustrative diagram illustrating a problem of a general information search system.

FIG. 5 is an illustrative diagram illustrating a structure of a query generation dictionary database used in the information search method according to the embodiment.

FIG. 6 is an illustrative diagram illustrating a structure of a standard relative value database used in the information search method according to the embodiment.

FIG. 7 is an illustrative diagram illustrating a structure of a personal relative value database used in the information search method according to the embodiment.

FIG. 8 is an illustrative diagram illustrating a method of digitizing a subjective representation included in the information search method according to the embodiment.

FIG. 9 is an illustrative diagram illustrating a method of digitizing a subjective representation included in the information search method according to the embodiment.

FIG. 18 is an illustrative diagram illustrating a functional configuration of a search apparatus capable of realizing an information search method according to a second variant of the embodiment.

DETAILED DESCRIPTION OF THE EMBODIMENT(S)

Figure 1:
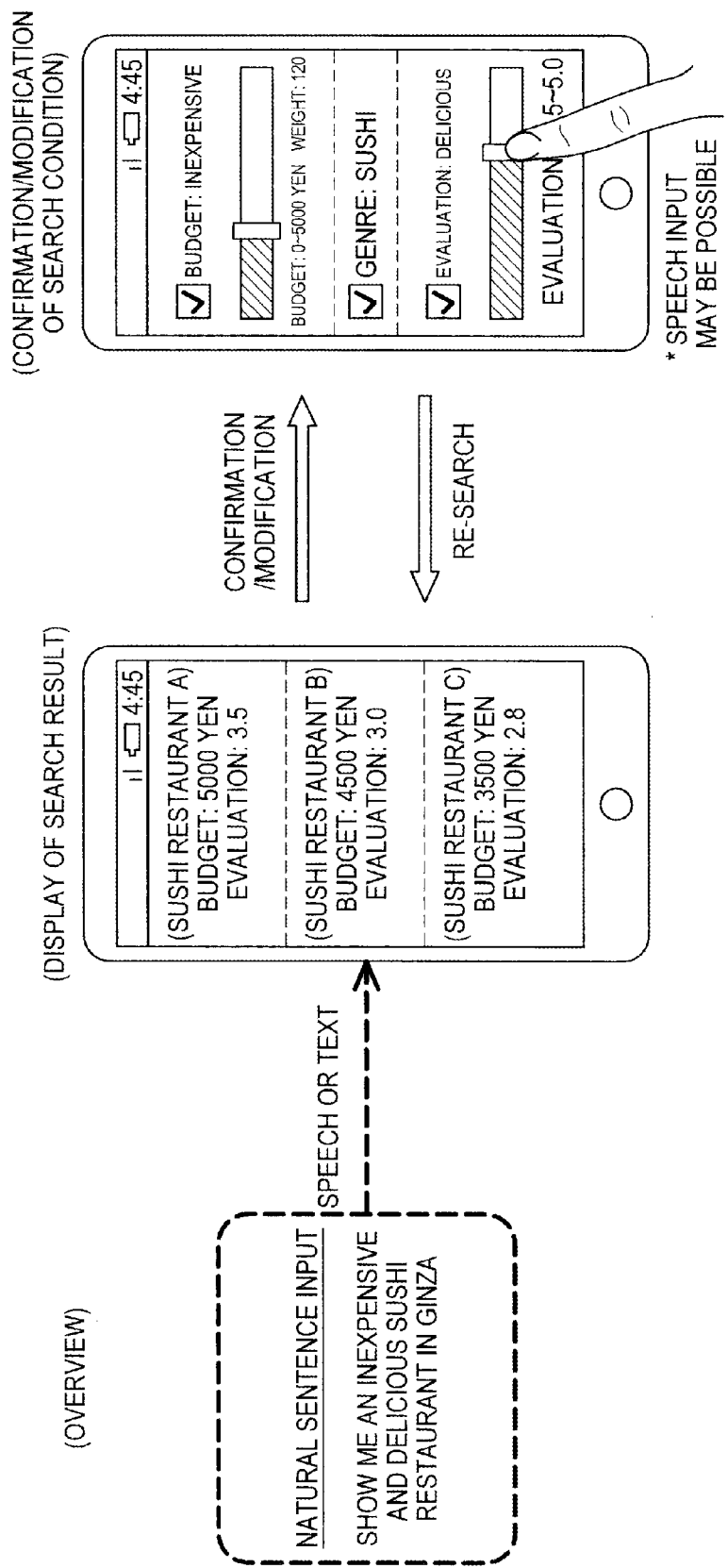
FIG. 1 is an illustrative diagram illustrating an overview of an information search method according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted

[Flow of Description]

Here, a flow of a description of embodiments of the present disclosure described hereinafter will be briefly described. First, an overview of the information search method according to the present embodiment will be described with reference to FIG. 1. Next, a problem of a general information search system will be described with reference to FIGS. 2 and 3.

Then, a functional configuration of the search apparatus 100 capable of realizing the information search method according to the present embodiment will be described with reference to FIG. 4. In this description, structures of various databases used in the information search method according to the present embodiment, a method of digitizing a subjective representation, or a method of modifying a search condition will be described in detail with reference to FIGS. 5 to 11. Also, a flow of a process performed by the search apparatus 100 to realize the information search method according to the present embodiment will be described with reference to FIGS. 12 and 13.

Next, a functional configuration of the search apparatus 130 according to a first variant of the present embodiment will be described with reference to FIGS. 14 and 15. Further, a flow of a process performed by the search apparatus 130 to realize an information search method according to the first variant of the present embodiment will be described with reference to FIGS. 16 and 17. Then, a functional configuration of a search apparatus 150 according to a second variant of the present embodiment will be described with reference to FIG. 18. Further, a flow of a process performed by the search apparatus 150 to realize an information search method according to the second variant of the present embodiment will be described with reference to FIGS. 19 and 20.

Next, a hardware configuration of an information processing apparatus capable of realizing functions of the search apparatuses 100, 130, and 150 according to the present embodiment will be described with reference to FIG. 21. Finally, the technical spirit of the present embodiment will be summarized and effects that can be obtained from the technical spirit of the present embodiment will be briefly described.

(Description Items)
1: Introduction
   1-1: Overview of Embodiment
   1-2: Subject of Information Search System
2: Embodiment
   2-1: Functional Configuration of Search Apparatus 100
   2-2: Information Search Method (Operation of Search Apparatus 100)
3: First variant
   3-1: Functional Configuration of Search Apparatus 130
   3-2: Information Search Method (Operation of Search Apparatus 130)
4: Second variant
   4-1: Functional Configuration of Search Apparatus 150
   4-2: Information Search method (Operation of Search Apparatus 150)
5: Hardware Configuration
6: Summary

1: Introduction

An overview of a technique according to an embodiment according to the present disclosure and a problem of a general information search system will be briefly described before describing the embodiment according to the present disclosure in detail.

[1-1: Overview of Embodiment]

First, an overview of a technique according to the present embodiment will be described with reference to FIG. 1. A technique according to the present embodiment relates to an information search system. In particular, a technique according to the present embodiment relates to a method of outputting a search result suitable for a user's intention based on a search condition when a natural sentence is input as the search condition. Further, a technique according to the present embodiment relates to a mechanism for, if a natural sentence containing a subjective representation to be converted into a numerical range is input, converting the subjective representation into an appropriate numerical range and efficiently performing a search using a search condition containing the numerical range.

For example, a case in which a natural language query, "Show me an inexpensive and delicious sushi restaurant in Ginza," is input as shown in FIG. 1 will be considered. In this case, "inexpensive" and "delicious" are subjective representations to be converted into numerical ranges. In a general information search system, the subjective representations are recognized as mere keywords and information wordings "inexpensive" or "delicious" are output as a search result. However, in the technique according to the present embodiment, "inexpensive" is converted into an appropriate price range and "delicious" is converted into an appropriate evaluation value range. Information is searched by a search condition with subjective representations converted into price ranges or evaluation value ranges.

Further, the technique according to the present embodiment includes a mechanism for enabling a user to confirm or modify a numerical range corresponding to a subjective representation. For example, if a subjective representation "inexpensive" is converted into a numerical range "budget: 0 to 5000 yen" as shown in FIG. 1, this numerical range is presented to a user so that the numerical range can be changed by the user. Similarly, if a subjective representation "delicious" is converted into a numerical range "evaluation: 2.5 to 5.0," this numerical range is presented to the user so that the numerical range can be changed by the user. Further, some of the search conditions may be deleted or each search condition may be weighted.

Also, the technique according to the present embodiment includes a mechanism for enabling a modification of a numerical range for a certain search result to be reflected to another search result. For example, in a search result with an input of a natural sentence, "Show me an inexpensive and delicious sushi restaurant in Ginza," as a search condition, if a numerical range "budget: 0 to 5000 yen" for a subjective representation "inexpensive" is modified, modified content is also reflected on a search result with an input of a natural sentence, "Show me an inexpensive soba restaurant in Shibuya," as a search condition. That is, the technique according to the present embodiment has a mechanism for enabling a user to eliminate a difference between a concept "inexpensive" of the user or a sense "inexpensive" thought by the user and a concept or sense "inexpensive" contained in the search result.

Thus, the technique according to the present embodiment relates to an information search system for converting a subjective representation in an appropriate numerical range to generate a search condition and efficiently performing a search based on the search condition. Further, the technique according to the present embodiment provides a mechanism capable of converting a subjective representation into an appropriate numerical range according to a search condition without using a large database. Further, the technique according to the present embodiment enables a user to modify information for converting a subjective representation into a numerical range and adjust a concept or sense represented by the subjective representation. The technique according to the present embodiment enables a search mechanism based on subjective representations to be personalized.

The overview of the technique according to the present embodiment has been briefly described. An information search method or a method of digitizing a subjective representation according to the present embodiment will be described later.

[1-2: Problem of Information Search System]

Next, a problem of the general information search system will be briefly described. Most general information search systems recognize a subjective representation contained in a natural sentence as a mere keyword and output information containing the keyword as a search result. However, information containing the subjective representation may not necessarily be information reflecting an intention of the subjective representation. Thereby, most search results of such information search systems do not reflect the user's intention. A method in which a database with subjective representations associated with numerical ranges is held and a subjective representation is converted into a numerical range using the database to reconfigure a search condition has been devised.

In the case of this method, for example, even when a natural sentence, "Show me an inexpensive sushi restaurant in Ginza," is input or a natural sentence, "Show me an inexpensive sushi restaurant in Shibuya," is input as shown in FIG. 2, numerical ranges corresponding to a subjective representation "inexpensive" are substituted with the same numerical range (in the example of FIG. 2, "budget: 0 to 5000 yen"). Now, market price of sushi in Ginza is assumed to be 8000 yen and market price of sushi in Shibuya is assumed to be 4000 yen. In this example, information on sushi restaurants corresponding to "budget: 0 to 5000 yen" in Ginza is output as a search result in response to an input of the natural sentence, "Show me an inexpensive sushi restaurant in Ginza." That is, information on the sushi restaurants with "inexpensive" sushi in Ginza is actually output.

Meanwhile, information on sushi restaurants corresponding to "budget: 0 to 5000 yen" in Shibuya is also output as a search result in response to an input of the natural sentence, "Show me an inexpensive sushi restaurant in Shibuya." That is, information on the sushi restaurant corresponding to "budget: 4000 to 5000 yen" is also output as a search result. Thereby, actually, information on sushi restaurants with "expensive" sushi in Shibuya is also output. Further, when "Show me an inexpensive soba restaurant in Ginza" is input, an inappropriate search result is similarly obtained. In order to prevent such an inappropriate output, it is necessary to hold a database in which place or target elements (elements having influence on the analysis of subjective representations), as well as the subjective representations and the numerical ranges, are associated, as shown in FIG. 3.

However, there are numerous elements having influence on the analysis of subjective representations and a great number of records to be held about the respective subjective representations, as apparent from the example of the database shown in FIG. 3. As a result, since time is necessary to find a desired record, search efficiency is degraded. Further, since a memory having a large storage capacity is necessary to hold a large database, cost greatly increases. Further, since it is difficult for a large database to be provided for each user, it is difficult for an association relationship between subjective representations and numerical ranges to be personalized.

Thus, the method of reconfiguring a search condition using a database with subjective representations associated with numerical ranges involves the problem as described above. The present inventor has devised a mechanism for resolving such a problem and increasing efficiency of a search with a natural sentence containing subjective representations as search conditions. Hereinafter, this mechanism will be described in detail.

2: Embodiment

An embodiment of the present disclosure will be described. The present embodiment relates to an information search method of converting a subjective representation into an appropriate numerical range to perform a search without using a large database.

[2-1: Functional Configuration of Search Apparatus 100]

First, a functional configuration of the search apparatus 100 capable of realizing the information search method according to the present embodiment will be described with reference to FIG. 4. FIG. 4 is an illustrative diagram illustrating the functional configuration of the search apparatus 100 according to the present embodiment.

Figure 4:
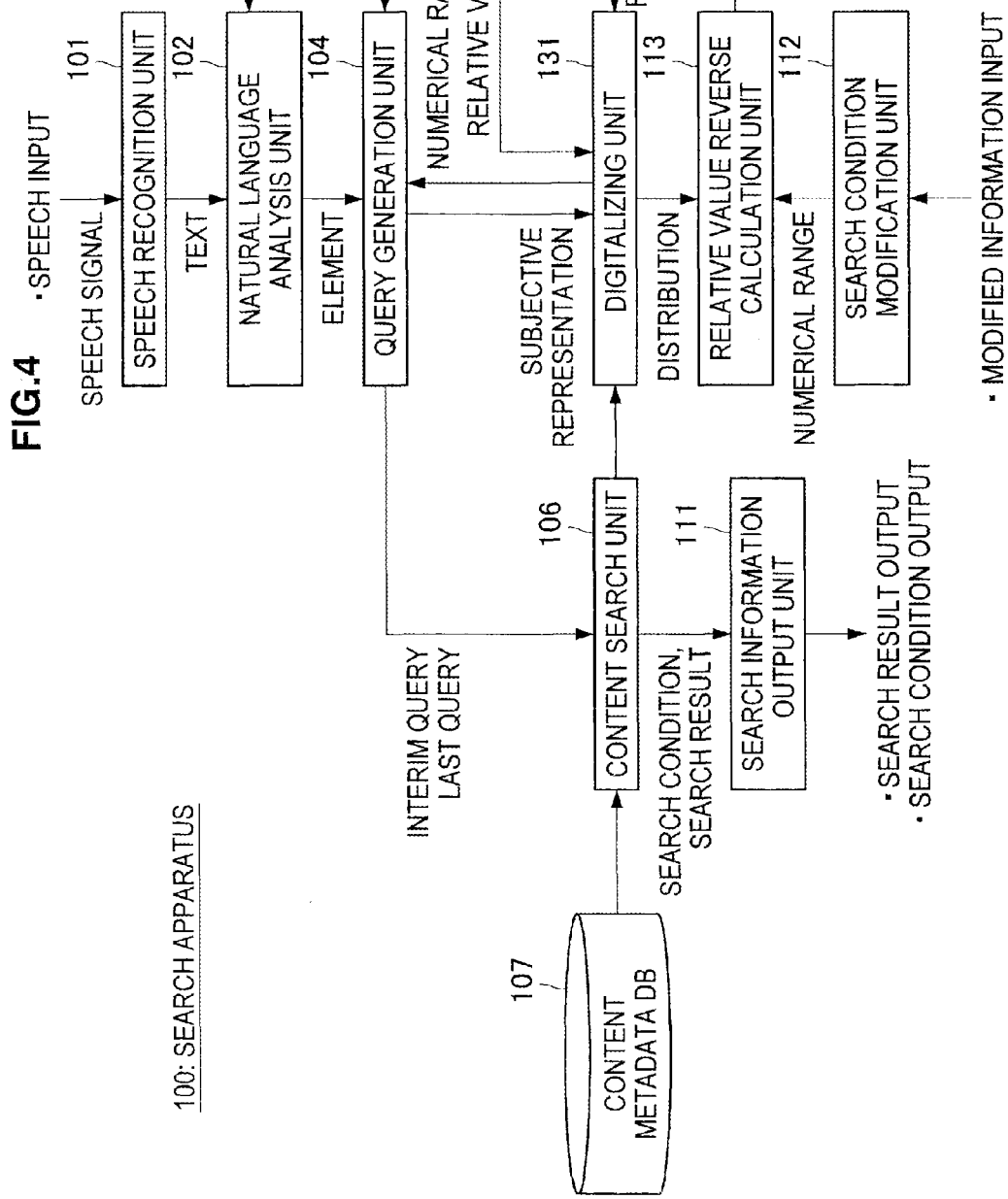
FIG. 4 is an illustrative diagram illustrating a functional configuration of a search apparatus capable of realizing an information search method according to the embodiment.
Figure 10:
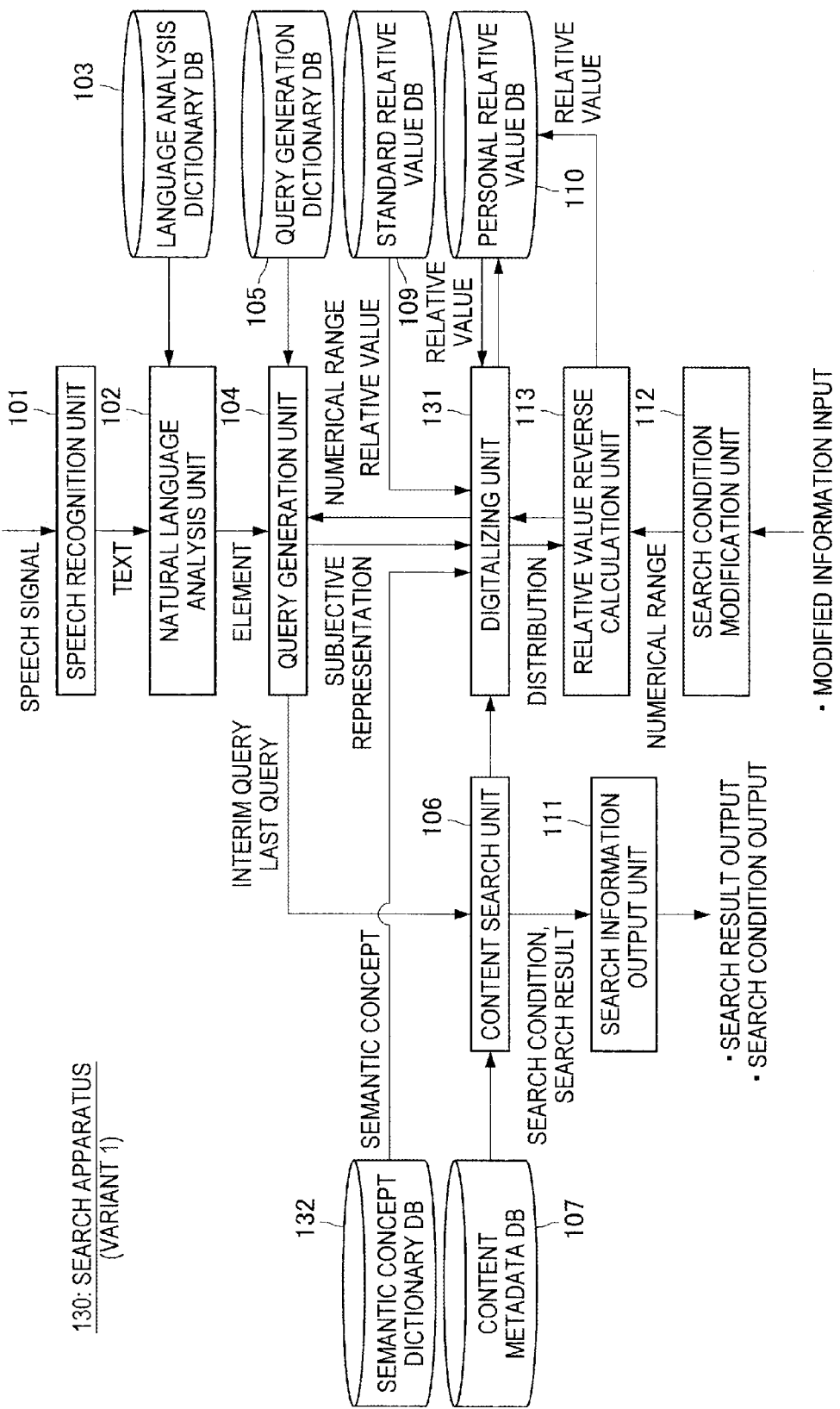
FIG. 10 is an illustrative diagram illustrating a structure of a content metadata database used in the information search method according to the embodiment.

As shown in FIG. 4, the search apparatus 100 includes a speech recognition unit 101, a natural language analysis unit 102, a language analysis dictionary database 103, a query generation unit 104, and a query generation dictionary database 105. Further, the search apparatus 100 includes a content search unit 106, a content metadata database 107, a digitizing unit 108, a standard relative value database 109, and a personal relative value database 110. Further, the search apparatus 100 includes a search information output unit 111, a search condition modification unit 112, and a relative value reverse calculation unit 113.

However, the language analysis dictionary database 103, the query generation dictionary database 105, the content metadata database 107, the standard relative value database 109, and the personal relative value database 110 are assumed to be stored in a storage means that is not shown. Alternatively, the language analysis dictionary database 103, the query generation dictionary database 105, the content metadata database 107, the standard relative value database 109, and the personal relative value database 110 may be provided external to the search apparatus 100. Further, the search apparatus 100 may have an input means and an output means, which are not shown.

The input means includes, for example, a keyboard, a mouse, a switch, a touch panel, a touch pad, or a microphone. Further, the output means includes, for example, a display or a speaker. Hereinafter, while a method of inputting a search condition through speech will be described by way of example, the method of inputting a search condition may be appropriately changed according to a type of the input means included in the search apparatus 100. Further, while a method of displaying and outputting a search result or a search condition is assumed for description, the method of displaying and outputting the search result or the search condition may be changed, for example, into speech output according to a type of the output means included in the search apparatus 100. It is understood that such a change is included in a technical scope of the present embodiment.

Hereinafter, a function and operation of the search apparatus 100 in a flow from search condition input through speech to search result output will be described.

First, speech is input using an input means by the user. In this case, the user inputs a search condition as if speaking to a friend. For example, the user inputs a natural language query, "Show me an inexpensive sushi restaurant in Ginza," as a search condition through speech. If the speech is input, a speech signal is output from the input means and input to the speech recognition unit 101. If the speech signal is input, the speech recognition unit 101 converts the input speech signal into a text. The speech recognition unit 101 inputs the text obtained by converting the speech signal to the natural language analysis unit 102.

If the text is input, the natural language analysis unit 102 performs natural language analysis such as morphological analysis to convert the input text into information such as parts of speech, an attribute, a phrase, and a dependency relation. For example, the natural language analysis unit 102 divides the natural sentence, "Show me an inexpensive sushi restaurant in Ginza" into phrases "in Ginza/inexpensive/sushi restaurant/show me." The natural language analysis unit 102 outputs an analysis result such as "Ginza: proper noun, place name" "sushi: noun, food name" ("word representation: parts of speech, attribute"). When such natural language analysis is performed, the natural language analysis unit 102 uses the language analysis dictionary database 103.

For example, information connecting a word with a concept or information indicating classification or usage of a word is stored in the language analysis dictionary database 103. In the following description, an individual phrase (e.g., one or more words) divided by the natural language analysis unit 102 is referred to as an element.

The elements extracted from the natural sentence by the natural language analysis unit 102 are input to the query generation unit 104. If the elements constituting the natural sentence are input, the query generation unit 104 generates a query for performing interim search (hereinafter interim query) using elements other than those elements corresponding to a subjective representation to be converted into a numerical range. First, the query generation unit 104 extracts elements of the natural sentence to be contained in the search condition. For example, if restaurant information is searched, the query generation unit 104 extracts elements of the natural sentence suitable for search conditions such as "place," "genre" and "budget."

In this case, the query generation unit 104 extracts elements of the natural sentence suitable for the search conditions in consideration of mapping information of "word representation, parts of speech, attribute," case, a dependency relation and the like registered in the query generation dictionary database 105 (e.g., see FIG. 5) in advance. For example, if a natural sentence, "Show me an inexpensive sushi restaurant in Ginza" is input as a search condition, the query generation unit 104 extracts "Ginza" as an element suitable for the search condition "place," and extracts "sushi" as an element suitable for the search condition "genre." Further, the query generation unit 104 extracts "inexpensive" as an element suitable for the search condition "budget." In this case, the query generation unit 104 confirms that the subjective element "inexpensive" is a subjective representation to be converted into a numerical range.

If the element suitable for each search condition is extracted, the query generation unit 104 combines elements other than subjective representations to generate an interim query. For example, the query generation unit 104 generates an interim query with objective elements "place: Ginza" and "genre: sushi" as search conditions. The interim query generated by the query generation unit 104 is input to the content search unit 106. If the interim query is input, the content search unit 106 extracts information suitable for the input interim query from the content metadata database 107 (e.g., see FIG. 10). For example, if the interim query with "place: Ginza" and "genre: sushi" is used as search conditions, the content search unit 106 can extract the search result as shown in FIG. 9.

The search result extracted by the content search unit 106 using the interim query is input to the digitizing unit 108. Further, a subjective representation to be converted into a numerical range is input from the query generation unit 104 to the digitizing unit 108. If a search result and a subjective representation based on the interim query are input, the digitizing unit 108 converts the input subjective representation into a numerical range based on the input search result. In this case, the digitizing unit 108 converts the subjective representation into the numerical range using the information stored in the standard relative value database 109 or the personal relative value database 110. The numerical range converted from the subjective representation by the digitizing unit 108 is input to the query generation unit 104.

Here, the method of converting a subjective representation into a numerical range will be described in greater detail.

First, configurations of the standard relative value database 109 and the personal relative value database 110 will be described with reference to FIGS. 6 and 7. As shown in FIG. 6, the standard relative value database 109 is a database with subjective representations associated with relative values. Further, records of the standard relative value database 109 are assumed to be set in advance. For example, a subjective representation "inexpensive" is associated with a relative value, 0% to 30%. Further, as shown in FIG. 7, the personal relative value database 110 is a database indicating an association relationship between subjective representations different from user to user and relative values. Further, the record of the personal relative value database 110 is added or modified if the relative value is modified by the user.

The relative value indicates a sense (e.g., sense of reasonable price) that a user desires to represent using a subjective representation. For example, a relative value, 0% to 30%, corresponding to a subjective representation, "inexpensive," means that the user feels a price range of a lower 0 to 30 percentile to be "inexpensive" in a list of price ranges extracted under certain conditions. That is, the standard relative value database 109 and the personal relative value database 110 quantitatively represent a user's sense of a subjective representation using a relative value. If this relative value is used, a subjective representation can be converted into a numerical range suitable for a user's sense on all such occasions even when a user's sense to the same subjective representation is changed according to a search condition.

Specifically, as shown in FIG. 8, a process of acquiring a distribution of a numerical characteristic (in the example of FIG. 8, a price range) from the search result based on the interim query and determining a numerical range suitable for the relative value from the distribution is performed. For example, if a subjective representation "very inexpensive" is contained in the natural sentence, the digitizing unit 108 extracts a relative value (0 to 10%) corresponding to the subjective representation from the standard relative value database 109 (see FIG. 6). Next, the digitizing unit 108 acquires the distribution of the price range from the search result based on the interim query. If the distribution of the price range is acquired, the digitizing unit 108 determines price (in the example of FIG. 8, 3200 yen) corresponding to a boundary at which the number of search results added up in order from an inexpensive one in the distribution of the acquired price range reaches 10%. By applying the 10% proportional threshold to the distribution, the digitizing unit 108 determines the numerical range corresponding to the subjective representation to be from 0 to 3200 yen.

Thus, the digitizing unit 108 determines a numerical range corresponding to the subjective representation using the search result and the relative value based on the interim query. The digitizing unit 108 converts the subjective representation into the numerical range. While the example in which the standard relative value database 109 is used is shown herein, the personal relative value database 110 is used if there is a record corresponding to the subjective representation in the personal relative value database 110.

Now, if the numerical range corresponding to the subjective representation is input to the query generation unit 104 by the digitizing unit 108, the query generation unit 104 generates a last query with the input numerical range added to the search condition. That is, the last query contains a numerical range corresponding to the search condition and the subjective representation contained in the interim query. The last query generated by the query generation unit 104 is input to the content search unit 106. If the last query is input, the content search unit 106 searches information of the content metadata database 107 based on the input last query. The content search unit 106 inputs the search result and the search condition based on the last query to the search information output unit 111.

If the search result and the search condition based on the last query are input, the search information output unit 111 outputs the input search result and search condition. For example, the search information output unit 111 displays the search result based on the last query, as shown in FIG. 1. If transition to a search condition modification screen is instructed by the user after the search result based on the last query is output, the search information output unit 111 displays the search condition. In particular, the search information output unit 111 displays the numerical range corresponding to the subjective representation. Further, the search information output unit 111 displays a manipulation object for manipulation so that the numerical range corresponding to the subjective representation can be modified, as shown in FIG. 11.

Figure 11:
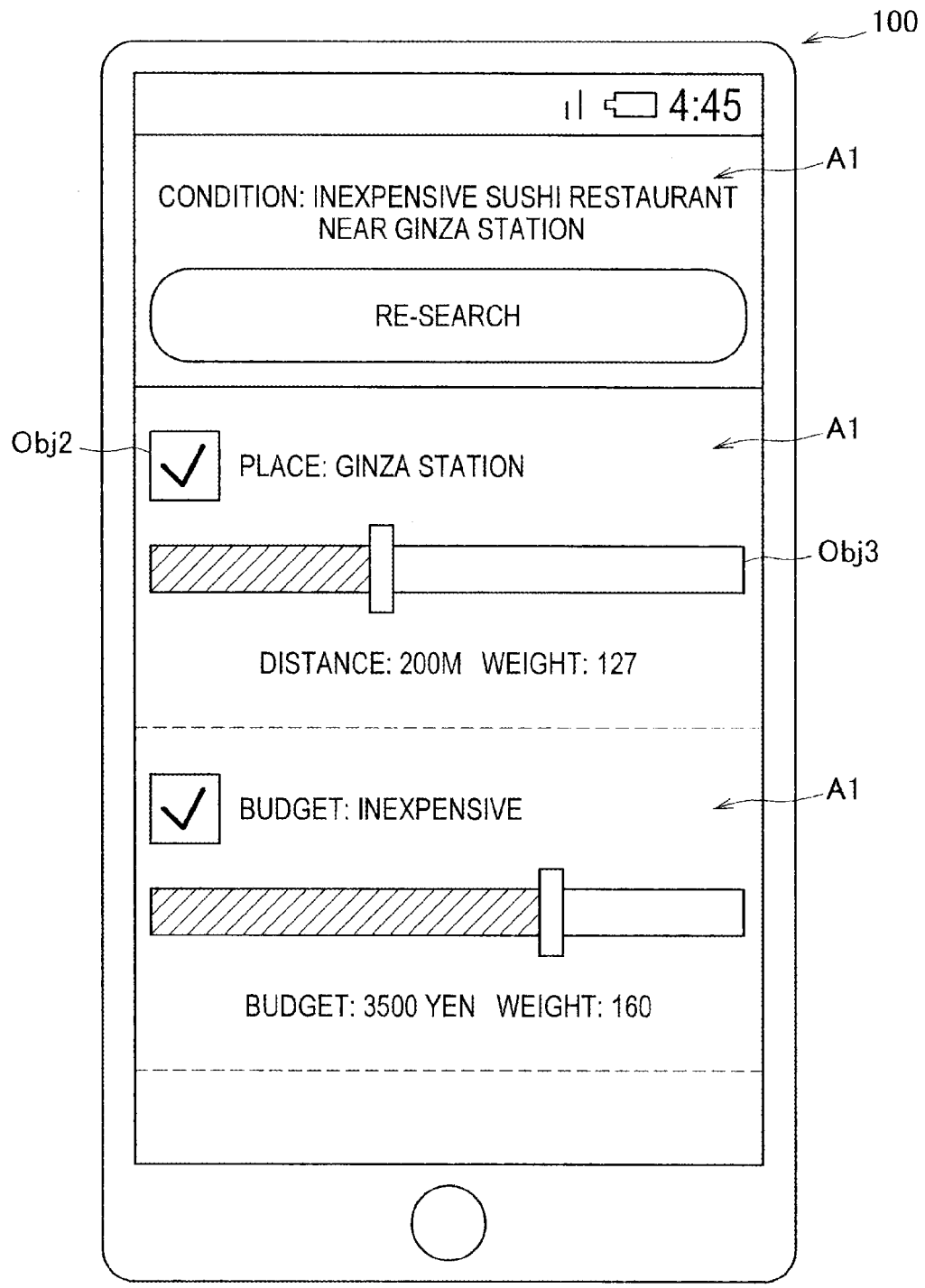
FIG. 11 is an illustrative diagram illustrating a display configuration of a screen for condition modification used in a search condition modification step included in the information search method according to the embodiment.

In the example of FIG. 11, three areas A1, A2 and A3 are displayed. A natural sentence, "inexpensive sushi restaurant near Ginza station," input as a search condition is displayed in the area A1. Further, a button Obj1 for performing a re-search based on the modified search condition is displayed in the area A1. If the user presses this button Obj1 after modifying the search condition, a search can performed based on the modified search condition.

Further, objects Obj2 and Obj3 for modifying a phrase that is an object of the subjective representation, the numerical range corresponding to the subjective representation, and the search condition are displayed in the areas A2 and A3. The object Obj2 is a check box for switching validity/invalidity of the search condition. For example, if the object Obj2 in the area A2 is unchecked, the search condition displayed in the area A2 becomes invalid. Meanwhile, the object Obj3 is a slide bar for modifying the numerical range. For example, if the bar of the object Obj3 in the area A2 is slid, the numerical range "distance" is changed. Alternatively, the objects Obj2 and Obj3 may not be the checkbox and the slide bar, respectively.

If the search condition is modified using such a user interface, modified content is input to the search condition modification unit 112. For example, if the numerical range corresponding to the subjective representation is modified, the search condition modification unit 112 inputs the modified numerical range to the relative value reverse calculation unit 113. If the modified numerical range is input, the relative value reverse calculation unit 113 acquires, from the digitizing unit 108, a distribution of the numerical range acquired from the search result based on the interim query, and calculates a relative value corresponding to the modified numerical range based on the acquired distribution. For example, if the numerical range of 0 to 3200 yen determined in the example of FIG. 8 is modified to 0 to 2500 yen, the relative value reverse calculation unit 113 calculates a percentage of the number of search results in which the price corresponds to 0 to 2500 yen in the distribution, and calculates a relative value based on the percentage. The user input to change the upper boundary from 3200 yen to 2500 yen thus changes the proportional threshold associated with "inexpensive" from one relative value (e.g., percentage) to another.

While the example described herein shows an upper limit of the numerical range being modified, a lower limit of the numerical range may be modified. Alternatively, both the upper limit and the lower limit of the numerical range may be modified. For example, it is possible for the user to modify the numerical range of 0 to 3200 yen to 1500 to 3000 yen. In this case, the relative value reverse calculation unit 113 calculates a percentage Q1 of the number of search results in which the price corresponds to 0 to 1500 yen in the distribution and a percentage Q2 of the number of search results in which the price corresponds to 0 to 3000 yen in the distribution, and determines relative values Q1 and Q2. Thus, multiple proportional thresholds may be modified and/or otherwise specified by the user, and the numerical range of the search condition may be arbitrarily broadened or narrowed.

If the relative value is calculated based on the modified numerical range, the relative value reverse calculation unit 113 updates the record of the personal relative value database 110 with the calculated relative value. However, if there is no record of the subjective representation corresponding to the calculated relative value in the personal relative value database 110, the relative value reverse calculation unit 113 adds the record to the personal relative value database 110. In this case, the relative value reverse calculation unit 113 individually identifies users based on user IDs and adds or updates a record, as shown in FIG. 7. Further, if a re-search is instructed by the user, a last query is generated by the numerical range based on the updated record stored in the personal relative value database 110 again, and information is searched based on the last query.

The function and operation of the search apparatus 100 has been described in the flow of a process from search condition input to search result output. As described above, the search apparatus 100 converts the subjective representation into the numerical range based on the relative value. As a result, a search result appropriately considering the analysis of the subjective representation varying with the search condition can be obtained. Further, since the subjective representation is represented by the relative value, the size of the database is small and information for converting the subjective representation into a numerical range can be realistically personalized.

(Supplemental Explanation 1: Method of Generating Interim Query)

In the description, the method of combining elements of the natural sentence other than subjective representations to generate the interim query has been introduced. However, if a plurality of subjective representations are contained in the natural sentence, the interim query may be generated using the following method. For example, a method in which a numerical range for an interim query for subjective representations is prepared as shown in FIG. 6 and this numerical range for an interim query is contained in a search condition constituting the interim query is considered. If this method is used, the number of search results based on the interim query can be suppressed by excluding search results considered to be unnecessary. As a result, efficiency of the process increases when a distribution is acquired from the search results based on the interim query. As a method of selecting a subjective representation using the numerical range for an interim query, for example, a method of preferentially selecting a subjective representation having a low weight, which will be described, may be considered.

(Supplemental Explanation 2: Weight Setting Method)

Further, the method for reflecting a modification action of a user to a search result has been discussed above. However, a frequently modified search condition is considered to be a search condition having relatively high importance for the user. Meanwhile, an invalidated search condition is considered to be a search condition having relatively low importance for the user. As the importance of the search condition is reflected in the search result, more accurate search is expected to be realized. A method of assigning a weight according to a modification action of a user when the record of the personal relative value database 110 is added or modified will be introduced.

For example, if the number of search results based on the interim query is greater than a given number, the user tries to limit the number of search results by adjusting the search conditions. In this case, the user is considered to change a search condition having relatively high importance. That is, a search condition changed to reduce the number of search results is considered to be a search condition having relatively high importance. For example, a search condition changed to decrease a width of the numerical range is considered to be a search condition having relatively high importance. Thereby, a weight of such a search condition is set to a great value.

On the other hand, if the number of search results based on the interim query is smaller than the given number, the user tries to increase the number of search results by adjusting search conditions or invalidating some of the search conditions. In this case, the user is considered to change or invalidate a search condition having relatively low importance. For example, the user tries to remove the limitations by broadening the numerical range of the search condition or invalidating the search conditions. Such a change of the search condition may be said to be a result of loose compromise of the user for a condition. That is, a search condition changed to increase the number of search results may be said to be those considered to be allowed to be compromised by the user. Thereby, a weight of such a search condition is set to a small value.

Further, a search condition having a high change frequency is considered to be a search condition noticed by the user. Thereby, a weight of the search condition having a high change frequency is set to a relatively great value or modified to have a great value. Further, a search condition having a great change amount is considered to be a search condition having relatively low importance for the user. That is, a search condition that may be greatly changed may be considered to be a search condition not too strongly required by the user. Thereby, a weight of the search condition having a great change amount is set to a relatively small value or modified to have a small value. Thus, a weight corresponding to each search condition is set according to a method by which the user changes the search condition.

This weight is considered as a weight of each search condition when search is performed. As a result, a search result greatly considering a search condition that is important for the user can be obtained. The weight setting method is not limited thereto, but any setting method may be applied as long as the weight is set to a value reflecting importance thought by the user.

(Supplemental Explanation 3: Method of Updating Relative Value)

In the above description, the method of directly registering the relative value calculated by the relative value reverse calculation unit 113 in the personal relative value database 110 has been introduced. However, if the relative value is extremely greatly changed due to the modification of the numerical range by a user, the relative value registered in the personal relative value database 110 may be limited. That is, since the analysis of the subjective representation may be considered not to be suddenly greatly changed, an extreme change of the relative value is not reflected in the personal relative value database 110. For example, a given number of logs may be accumulated and an average of the logs may be calculated and registered in the personal relative value database 110.

Further, a search satisfaction degree is input by a user and a relative value subjected to weighted average based on the input search satisfaction degree may be registered in the personal relative value database 110. For example, if a first changed relative value is 0 to 23% (search satisfaction degree is 50), a second changed relative value is 5 to 23% (search satisfaction degree is 70), and a third changed relative value is 5 to 30% (search satisfaction degree is 80), a weighted average is (0*50+5*70+5*80)/200–(23*50+23*70+30*80)/200. This value is registered in the personal relative value database 110, thereby preventing the relative value from being extremely greatly changed.

Further, the search satisfaction degree may be manually input by the user, or may be automatically calculated based on, for example, a screen retention time. As the method by which a user manually inputs a search satisfaction degree, a method of inputting a search satisfaction degree as a numerical value or a method of causing a check box indicating whether a user is satisfied with an individual search result to be checked and calculating a search satisfaction degree from the check result is considered. Further, as the screen retention time, for example, a time for which a detailed search result has been referenced or a time for which content such as a movie or music has been used is considered. It is possible to a obtain search satisfaction degree by using such a method.

The functional configuration of the search apparatus 100 according to the present embodiment has been described above.

[2-2: Information Search Method (Operation of Search Apparatus 100)]

Figure 12:
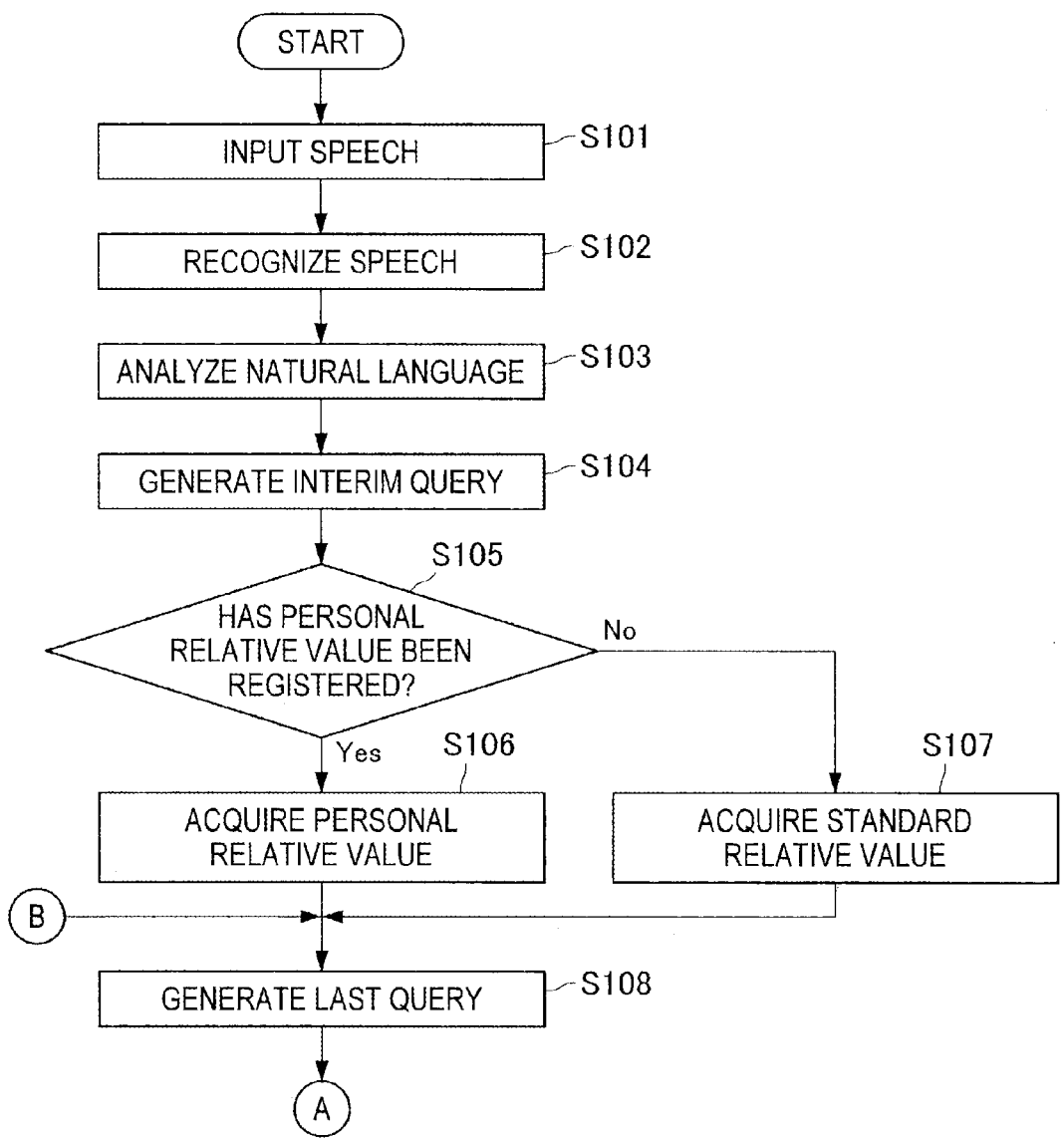
FIG. 12 is an illustrative diagram illustrating a flow of a process performed to realize the information search method according to the embodiment.
Figure 13:
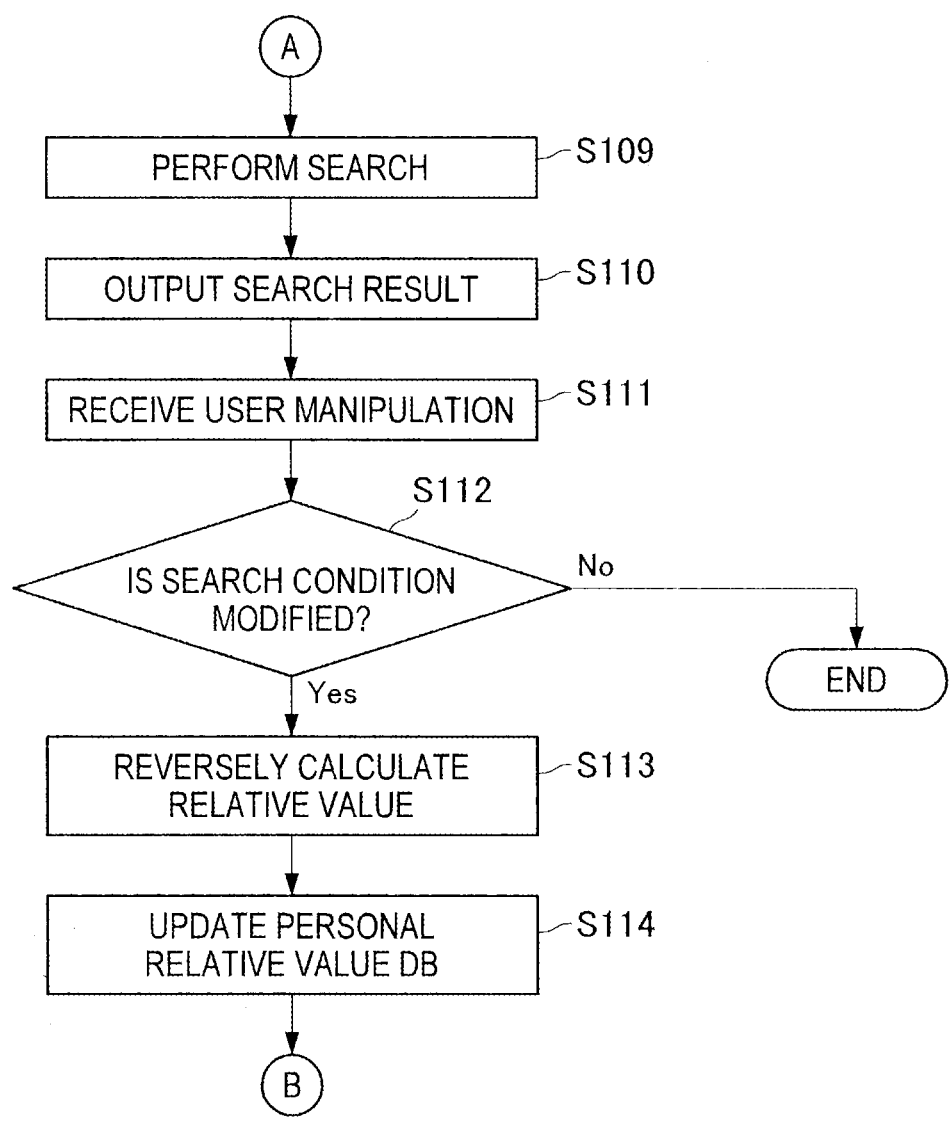
FIG. 13 is an illustrative diagram illustrating a flow of a process performed to realize the information search method according to the embodiment.

Next, the information search method according to the present embodiment will be described with reference to FIGS. 12 and 13. FIGS. 12 and 13 are flowcharts showing a flow of a process that is performed to realize the information search method according to the present embodiment.

First, refer to FIG. 12. As shown in FIG. 12, first, a search condition is input through speech by the user (S101). If the search condition is input through speech by the user, the search apparatus 100 converts the input speech into text using the function of the speech recognition unit 101 (S102). The search apparatus 100 then analyzes the search condition (e.g., natural language query) converted to the text using the function of the natural language analysis unit 102 (S103). The search apparatus 100 then combines elements of the natural sentence obtained by the analysis in step S103 to generate an interim query using the function of the query generation unit 104 (S104). In this case, the query generation unit 104 combines the elements of the natural sentence other than a subjective representation (e.g., the objective elements) to be converted into a numerical range to generate the interim query.

Next, the search apparatus 100 performs the search based on the interim query using the function of the content search unit 106, and acquires search results based on the interim query. The search apparatus 100 then confirms whether a record corresponding to the subjective representation to be converted into the numerical range has been registered in the personal relative value database 110 using the function of the digitizing unit 108 (S105). If the record has been registered in the personal relative value database 110, the process in the search apparatus 100 proceeds to step S106. On the other hand, if the record has not been registered in the personal relative value database 110, the process in the search apparatus 100 proceeds to step S107.

If the process proceeds to step S106, the search apparatus 100 acquires a relative value corresponding to the subjective representation from the personal relative value database 110 (S106). On the other hand, if the process proceeds to step S107, the search apparatus 100 acquires a relative value corresponding to the subjective representation from the standard relative value database 109 (S107). The search apparatus 100 having acquired the relative value acquires a distribution of the numerical characteristic from the search result based on the interim query using the function of the digitizing unit 108, and determines a numerical range corresponding to the relative value based on the distribution (e.g., by applying one or more proportional thresholds based on the relative value to the distribution). The search apparatus 100 generates a last query with the determined numerical range added to the search condition, using the function of the query generation unit 104 (S108), and the process proceeds to step A.

Next, refer to FIG. 13. As shown in FIG. 13, the search apparatus 100 in which the process has proceeded to step A performs a search based on the last query generated in step S108 using the function of the content search unit 106 (S109). The search apparatus 100 then outputs the search result based on the last query using the function of the search information output unit 111 (S110). Further, the search apparatus 100 displays the search conditions contained in the last query and an interface for modifying the search conditions using the function of the search information output unit 111, and receives user input such as a user manipulation (S111). The search apparatus 100 then judges whether the search condition has been modified by the user (S112).

If the search condition has been modified, the process in the search apparatus 100 proceeds to step S113. On the other hand, if the search condition has not been modified, the search apparatus 100 ends the series of processes. If the process proceeds to step S113, the search apparatus 100 calculates a relative value from the modified numerical range using the function of the relative value reverse calculation unit 113 (S113). In this case, the relative value reverse calculation unit 113 calculates the relative value using the distribution acquired from the search result based on the interim query.

Next, the search apparatus 100 updates the personal relative value database 110 with the relative value calculated in step S113 using the function of the relative value reverse calculation unit 113 (S114). However, if there is no corresponding record in the personal relative value database 110, the relative value reverse calculation unit 113 adds a record of the subjective representation corresponding to the calculated relative value to the personal relative value database 110.

After the search apparatus 100 ends the process of step S114, the process proceeds to step B. That is, the process in the search apparatus 100 returns to step S108 shown in FIG. 12, and performs the process from step S108 again. The search apparatus 100 iteratively performs the process of steps S108 to S114 until the search condition modification by the user is completed, and ends the series of processes after the search condition modification ends. Further, if a plurality of subjective elements are contained in a natural sentence input as a search condition, the process from step S104 is performed on each subjective representation.

The information search method according to the present embodiment has been described above.

3: First Variant

Next, a first variant of the present embodiment will be described. The present variant relates to a method of reflecting a fine condition of a user on a search result.

[3-1: Functional Configuration of Search Apparatus 130]

First, a functional configuration of the search apparatus 130 according to the present variant will be described with reference to FIG. 14. FIG. 14 is an illustrative diagram illustrating a functional configuration of the search apparatus 130 according to the present variant. Components having substantially the same functions as those of the search apparatus 100 are assigned the same reference numerals and a detailed description thereof will be omitted.

Figure 14:
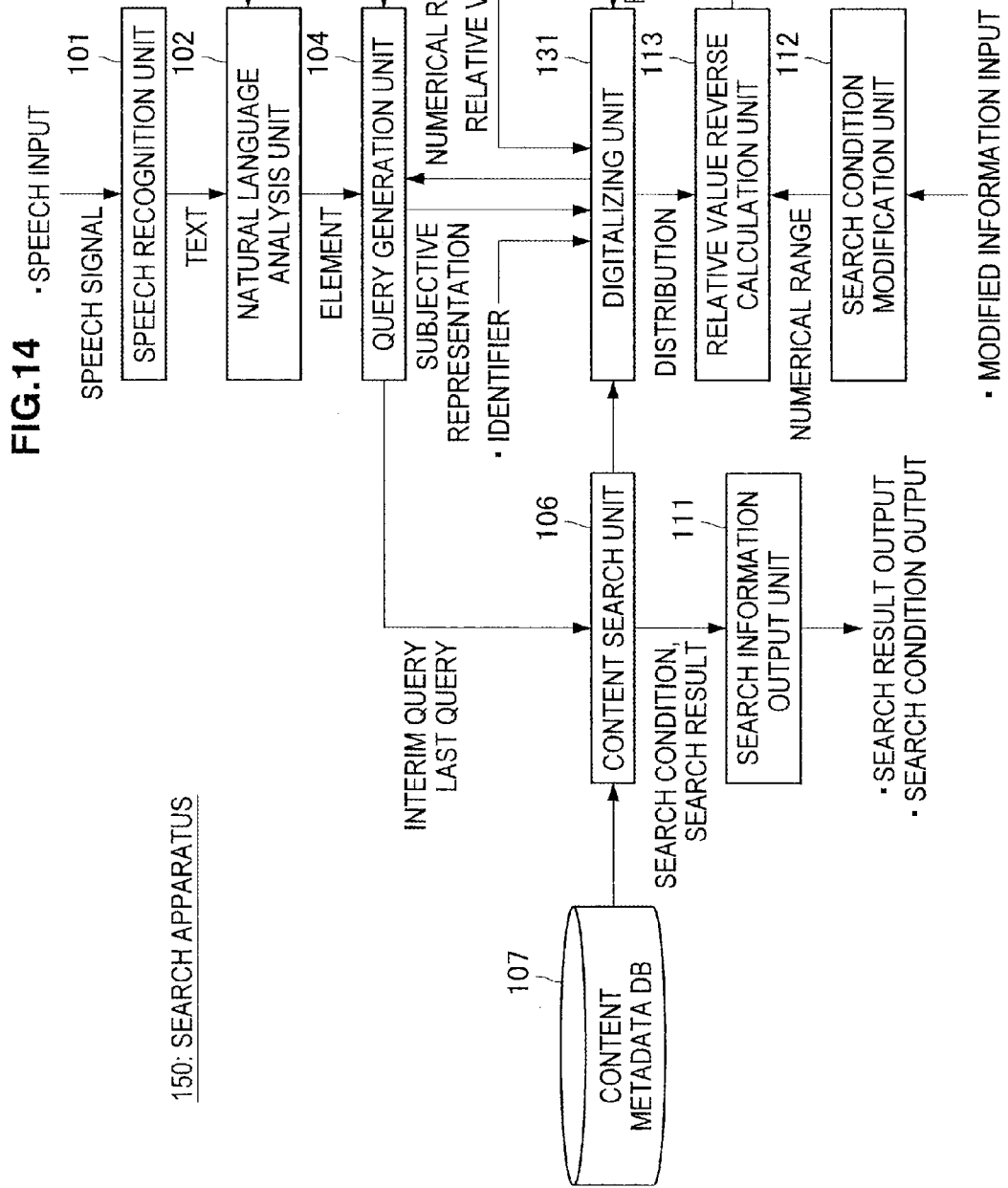
FIG. 14 is an illustrative diagram illustrating a functional configuration of a search apparatus capable of realizing an information search method according to the first variant of the embodiment.

As shown in FIG. 14, the search apparatus 130 includes a speech recognition unit 101, a natural language analysis unit 102, a language analysis dictionary database 103, a query generation unit 104, and a query generation dictionary database 105. Further, the search apparatus 130 includes a content search unit 106, a content metadata database 107, a digitizing unit 13, a standard relative value database 109, and a personal relative value database 110. Further, the search apparatus 130 includes a search information output unit 111, a search condition modification unit 112, a relative value reverse calculation unit 113, and a semantic concept dictionary database 132.

A difference with the search apparatus 100 is in a function of the digitizing unit 131 and presence of the semantic concept dictionary database 132. Only configurations of the digitizing unit 131 and the semantic concept dictionary database 132 will be described in detail.

As described above, an object of the present variant is to reflect a fine condition of a user on a search result. For example, a certain user is assumed to consider that "taste is important for sushi while a low price is important for a pub." The user is assumed to have input a natural sentence, "Show me an inexpensive and delicious sushi restaurant in Ginza," as a search condition and obtained a normal search result. Further, if the search condition is modified based on the search result, relative values corresponding to subjective representations "inexpensive" and "delicious" may be considered to be modified based on a condition for "sushi restaurant." Then, if a natural sentence, "Show me an inexpensive and delicious pub in Ginza" is input and a search is performed, the search is performed based on the relative value reflecting a condition for "sushi restaurant."

Thus, if there is a fine condition of a user, a search result suitable for the analysis of a subjective representation of a user may not be obtained. Of course, if the search condition is modified, an appropriate search result may be obtained, but modifying the search condition one by one is complicated. In the present variant, a method of reflecting such a condition of the user on the search result by clustering an object of a subjective representation (an element of the natural sentence) is proposed. Components for realizing this method are the digitizing unit 131 and the semantic concept dictionary database 132.

Figure 15:
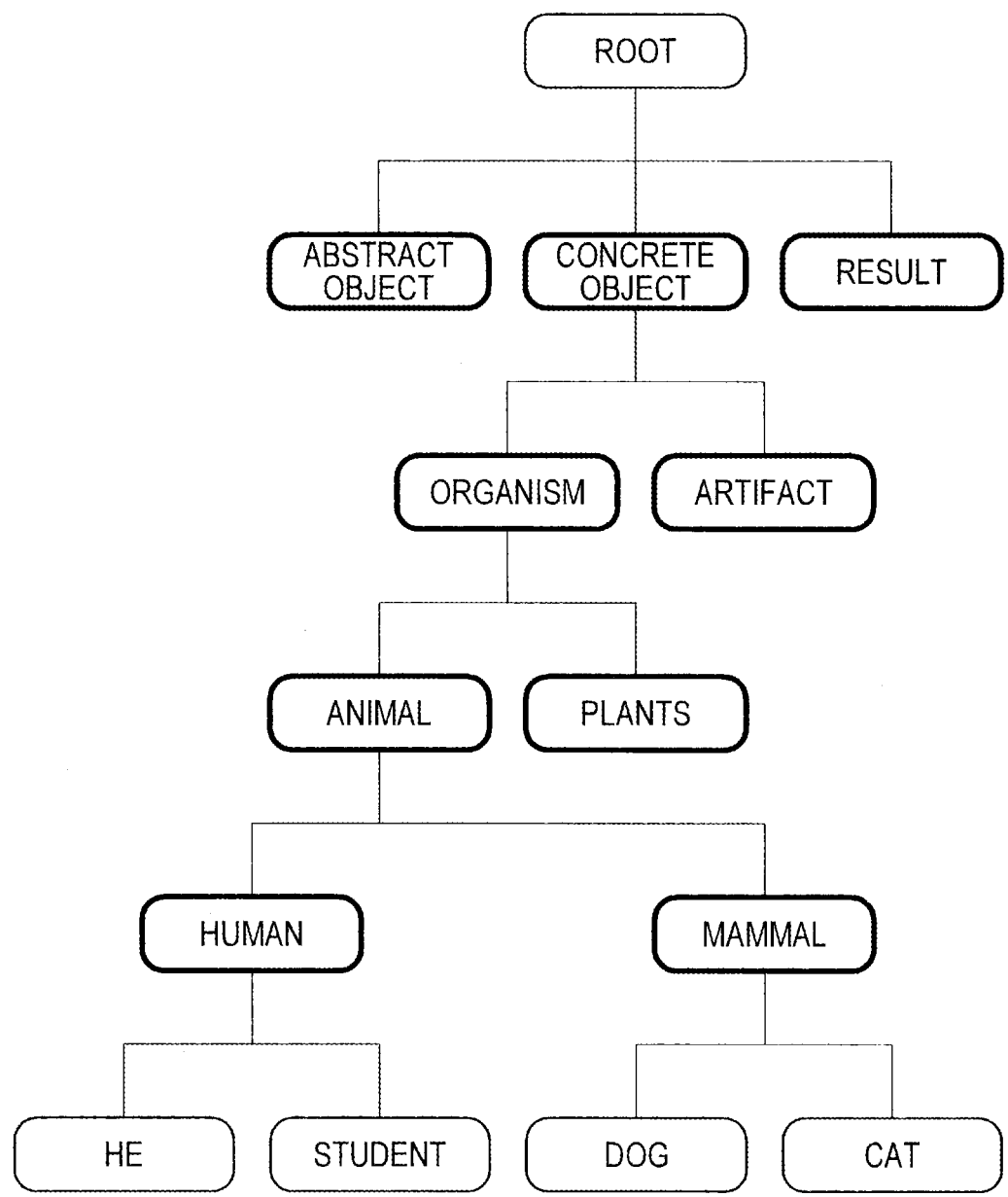
FIG. 15 is an illustrative diagram illustrating a configuration of a semantic concept dictionary database used in the information search method according to the first variant of the embodiment.

The digitizing unit 131 clusters the object using the semantic concept dictionary database 132 having a structure as shown in FIG. 15 (a conceptual diagram of a data structure) and recognizes a difference of a concept (the analysis of the subjective representation) according to objects. First, the digitizing unit 131 uses dependency analysis to recognize an object from the natural sentence. For example, for a natural sentence, "Show me an inexpensive and delicious sushi restaurant in Ginza," the digitizing unit 131 recognizes that a "sushi restaurant" is the object. Next, the digitizing unit 131 stores a combination of the object, a subjective representation, and a relative value in the personal relative value database 110. In this example, a record having a combination of sushi restaurant, inexpensive, and 0 to 35% is stored in the personal relative value database 110.

Then, if the natural sentence, "Show me an inexpensive and delicious pub in Shibuya," is input as a search condition by the user, a search is assumed to be performed based on this search condition. In this case, the digitizing unit 131 converts the subjective representation into a numerical range using a relative value "0 to 35%" corresponding to the subjective representation "inexpensive" by referencing the record having a combination of sushi restaurant, inexpensive, and 0 to 35%, which is stored in the personal relative value database 110. Then, if a relative value is greatly modified by the user (e.g., if the relative value is modified to 0 to 20%), the digitizing unit 131 stores a record having a combination of pub, inexpensive, and 0 to 20% in the personal relative value database 110.

Conversely, if the relative value is not greatly modified by the user (e.g., if the relative value is modified to 0 to 32%), a record about "sushi restaurant" stored in the personal relative value database 110 is updated using a word of a parent node having both the sushi restaurant and the pub as child nodes using a tree structure of the semantic concept dictionary database 132. For example, the digitizing unit 131 updates an original record with the record having a combination of restaurant, inexpensive, and 0 to 33.5% using a word, "restaurant," corresponding to the parent node of the "sushi restaurant" and the "pub." A numerical value 33.5% is an average of 35% and 32%.

Further, if there are a plurality of records as described above (e.g., "pub, inexpensive and 0 to 20%" and "sushi restaurant, inexpensive, and 0 to 35%") for one subjective representation, search is assumed to be performed with another search condition (e.g., a natural sentence, "Show me an inexpensive bar in Roppongi"). In this case, the digitizing unit 131 uses a record of "pub, inexpensive, and 0 to 20%." This is because "pub" and "bar" are judged to be nearer than "sushi restaurant" and "bar" based on the semantic concept dictionary database 132. This judgment is made based on a distance to a node (parent node) common to two words as subjects. In the case of this example, if "pub" and "bar" are merged by an object "drinking establishment," they may be judged to be nearer than "sushi restaurant" and "bar."

Thus, the digitizing unit 131 clusters an object having an influence on the analysis of the subjective representation or manages the relative value in object or cluster units using the semantic concept dictionary database 132. This configuration can realize both an adaptive search not dependent on the object and a specific search dependent on the object, thereby realizing a search reflecting a condition of the user.

A functional configuration of the search apparatus 130 according to the first variant of the present embodiment has been described above.

[3-2: Information Search Method (Operation of Search Apparatus 130)]

Figure 16:
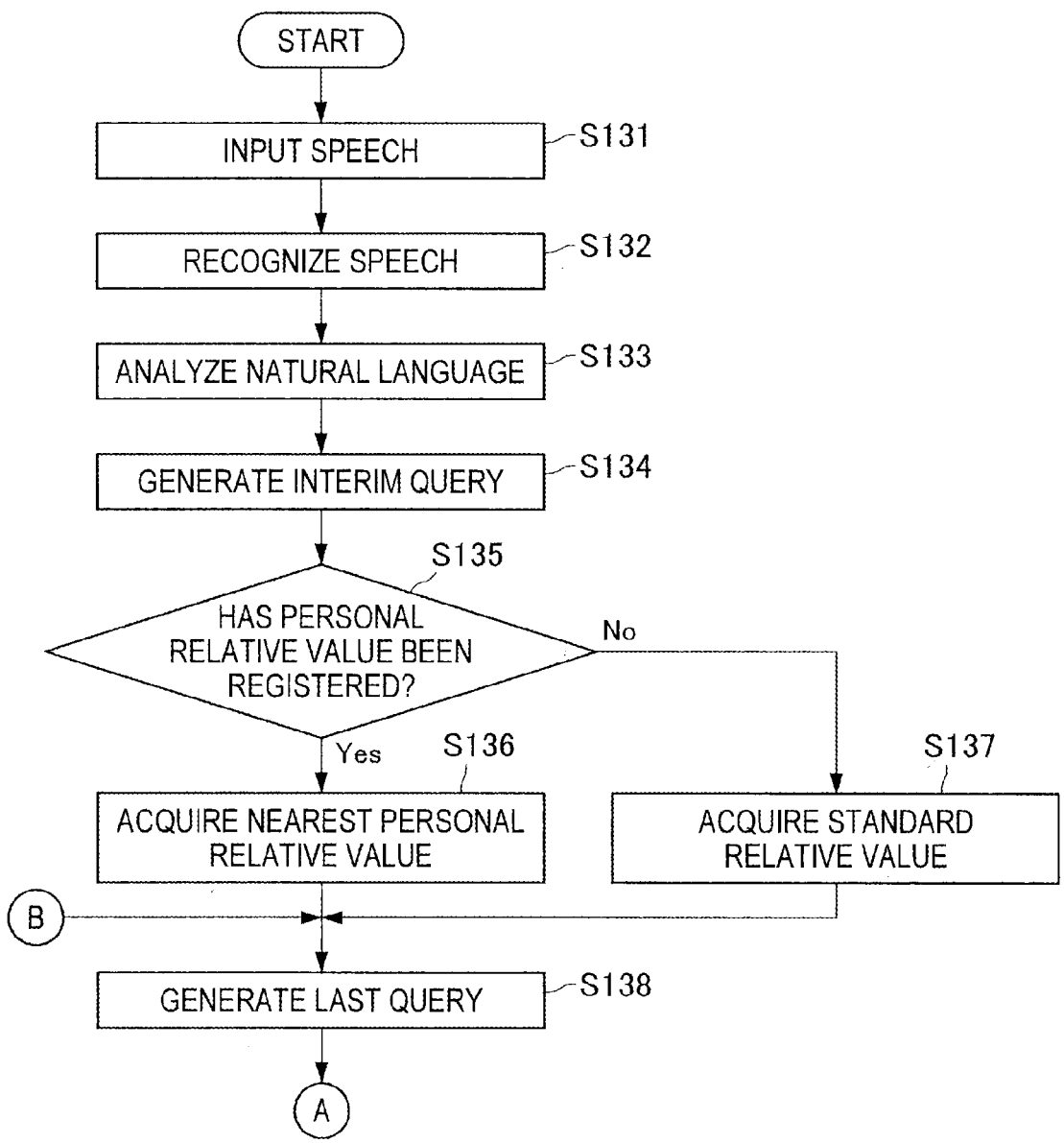
FIG. 16 is an illustrative diagram illustrating a flow of a process performed to realize the information search method according to the first variant of the embodiment.
Figure 17:
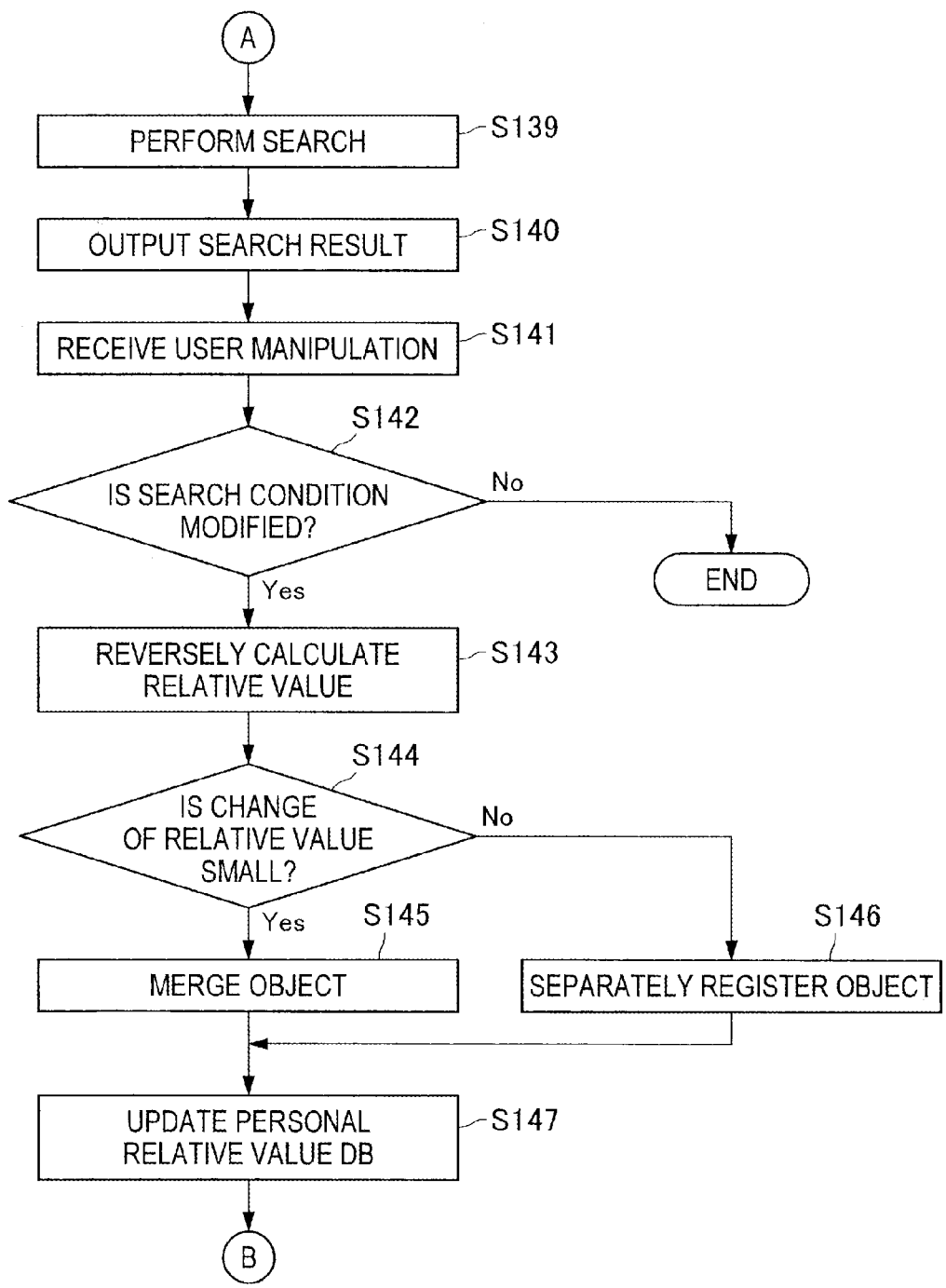
FIG. 17 is an illustrative diagram illustrating a flow of a process performed to realize the information search method according to the first variant of the embodiment.

Next, an information search method according to the first variant of the present embodiment will be described with reference to FIGS. 16 and 17. FIGS. 16 and 17 are flowcharts showing flows of a process executed to realize the information search method according to the first variant of the present embodiment.

First, refer to FIG. 16. First, a search condition is input through speech by the user, as shown in FIG. 16 (S131). If the search condition is input through speech by the user, the search apparatus 130 converts the input speech into text using the function of the speech recognition unit 101 (S132). The search apparatus 130 then analyzes the search condition (natural sentence) converted into the text using the function of the natural language analysis unit 102 (S133). The search apparatus 130 then combines elements of the natural sentence obtained by the analysis in step S133 to generate an interim query using the function of the query generation unit 104 (S134). In this case, the query generation unit 104 combines the elements of the natural sentence other than the subjective representation to be converted into the numerical range to generate the interim query.

Next, the search apparatus 130 performs the search based on the interim query and acquires the search result based on the interim query using the function of the content search unit 106. The search apparatus 130 then confirms whether a record corresponding to the subjective representation to be converted into the numerical range has been registered in the personal relative value database 110 using the function of the digitizing unit 131 (S135). If the record has been registered in the personal relative value database 110, the process in the search apparatus 130 proceeds to step S136. On the other hand, if the record has not been registered in the personal relative value database 110, the process in the search apparatus 130 proceeds to step S137.

If the process proceeds to step S136, the search apparatus 130 acquires, from the personal relative value database 110, a relative value recorded in a record containing a word closest to an object contained in the search condition by referencing the semantic concept dictionary database 132 using the function of the digitizing unit 131 (S136). On the other hand, if the process proceeds to step S137, the search apparatus 130 acquires a relative value corresponding to the subjective representation from the standard relative value database 109 (S137). The search apparatus 130 having acquired the relative value acquires a distribution of the numerical range from the search result based on the interim query using the function of the digitizing unit 131, and determines a numerical range corresponding to the relative value based on the distribution. The search apparatus 130 generates a last query with the determined numerical range added to the search condition using the function of the query generation unit 104 (S138), and the process proceeds to step A.

Next, refer to FIG. 17. As shown in FIG. 17, the search apparatus 130 in which the process has proceeded to step A performs a search based on the last query generated in step S138 using the function of the content search unit 106 (S139). Next, the search apparatus 130 outputs the search result using the function of the search information output unit 111, based on the last query (S140). Further, the search apparatus 130 displays search conditions contained in the last query and an interface for modifying the search conditions using the function of the search information output unit 111, and receives a user manipulation (S141). Next, the search apparatus 130 judges whether the search condition has been modified by the user (S142).

If the search condition has been modified, the process in the search apparatus 130 proceeds to step S143. On the other hand, if the search condition has not been modified, the search apparatus 130 ends the series of processes. If the process proceeds to step S143, the search apparatus 130 calculates a relative value from the modified numerical range using the function of the relative value reverse calculation unit 113 (S143). In this case, the relative value reverse calculation unit 113 calculates the relative value using the distribution acquired from the search result based on the interim query. Next, the search apparatus 130 judges whether a modification width of the relative value is smaller than a given value using the function of the digitizing unit 131 (S144). If the modification width of the relative value is smaller than the given value, the process in the search apparatus 130 proceeds to step S145. On the other hand, if the modification width of the relative value is greater than the given value, the process in the search apparatus 130 proceeds to step S146.

If the process proceeds to step S145, the search apparatus 130 generates a record with a merged object by referencing the semantic concept dictionary database 132 using the function of the digitizing unit 131 (S145). On the other hand, if the process proceeds to step S146, the search apparatus 130 generates a record for separately registering the object using the function of the digitizing unit 131 (S146). The search apparatus 130 in which the process has proceeded to step S147 updates the personal relative value database 110 with the record generated in step S145 or S146 using the function of the digitizing unit 131 (S147).

The process in the search apparatus 130, which has ended the process of step S147, proceeds to step B. That is, the process in the search apparatus 130 returns to step S138 shown in FIG. 16 and the search apparatus 130 performs the process from step S138 again. The search apparatus 130 iteratively performs the process of steps S138 to S147 until the search condition modification by the user is completed, and ends the series of processes after the search condition modification ends. If a plurality of subjective representations are contained in a natural sentence input as a search condition, the process from step S134 is performed on each subjective representation.

The information search method according to the first variant of the present embodiment has been described above.

4: Second Variant

Next, a second variant of the present embodiment will be described. The present variant relates to a method of automatically adjusting a search condition for a subjective representation based on a weight of the search condition if the number of search results is too great or small.

[4-1: Functional Configuration of Search Apparatus 150]

First, a functional configuration of a search apparatus 150 according to the present variant will be described with reference to FIG. 18. FIG. 18 is an illustrative diagram illustrating the functional configuration of the search apparatus 150 according to the present variant. Components having substantially the same function as those of the search apparatus 100 are assigned the same reference numerals and a detailed description thereof will be omitted.

As shown in FIG. 18, the search apparatus 150 includes a speech recognition unit 101, a natural language analysis unit 102, a language analysis dictionary database 103, a query generation unit 104, and a query generation dictionary database 105. The search apparatus 150 further includes a content search unit 106, a content metadata database 107, a digitizing unit 151, a standard relative value database 109, and a personal relative value database 110. The search apparatus 150 further includes a search information output unit 111, a search condition modification unit 112, and a relative value reverse calculation unit 113.

A difference with the search apparatus 100 is in the digitizing unit 151. Only a configuration of the digitizing unit 151 will be described in detail.

As described above, an object of the present variant is to determine a search condition to be changed and a change amount in consideration of a weight of a concept held by a user (a weight assigned to each subjective representation; see FIG. 7) when the number of search results is too great or small. For example, if a natural sentence, "a delicious sushi restaurant for 2000 yen or less in Ginza," is input as a search condition, since a severe restriction of 2000 yen or less is contained, the sufficient number of search results may not be obtained.

Meanwhile, if a natural sentence, "pub in Shibuya," is input as a search condition, since there are a small number of elements to decrease the number of search results, a great number of search results that cannot be all selected by the user are highly likely to be obtained. Thus, if the number of search results is great or small, the search conditions are re-examined. The present variant provides a mechanism for automatically performing such a re-examination of the search conditions The weight for the subjective representation is stored in the personal relative value database 110, as shown in FIG. 7. The digitizing unit 151 adjusts a relative value corresponding to the subjective representation having a small weight to be great or invalidates a search condition corresponding to the subjective representation by referencing the personal relative value database 110.

For example, a user severely considering a place and roughly considering a budget is considered. Further, the user is assumed to set a weight for the "place" to 160 and a weight for the "budget" to 75. If search results cannot be sufficiently obtained for an input of a certain natural sentence, the user may change either a numerical range of the "place" or a numerical range of the "budget."

As described above, the user severely considers the place. Thereby, the user may not greatly change the numerical range for the place. On the other hand, since the user roughly considers the budget, a great change of the numerical range for the budget may be permitted. For this reason, the digitizing unit 151 updates the relative value, for example, based on the following algorithm.

```
// prerequisite
    Weight of "inexpensive": 0.75
    Relative value Y of "inexpensive": lower 30 percentile
    Current hit number a: 5
    Appropriate hit number range b: 10 to 50 (given value)
// Calculation of variable Z for parameter adjustment (common to all
search conditions)
    Z=f(a, b)=f(5, [10: 50])
      =−100*(10−5)/10
      =−50
    Z'=F (X, Z)=F (0.75, −50)
      =−50/0.75
      =−67
// Calculation a relative value Y' of "inexpensive" after modification (for
"budget")
    factor=(100−Z')/100
      =1.67
    Y'=30*1.67
      =lower 50.1 percentile
```

The functional configuration of the search apparatus 150 according to the second variant of the present embodiment has been described.

[4-2: Information Search Method (Operation of Search Apparatus 150)]

Figure 19:
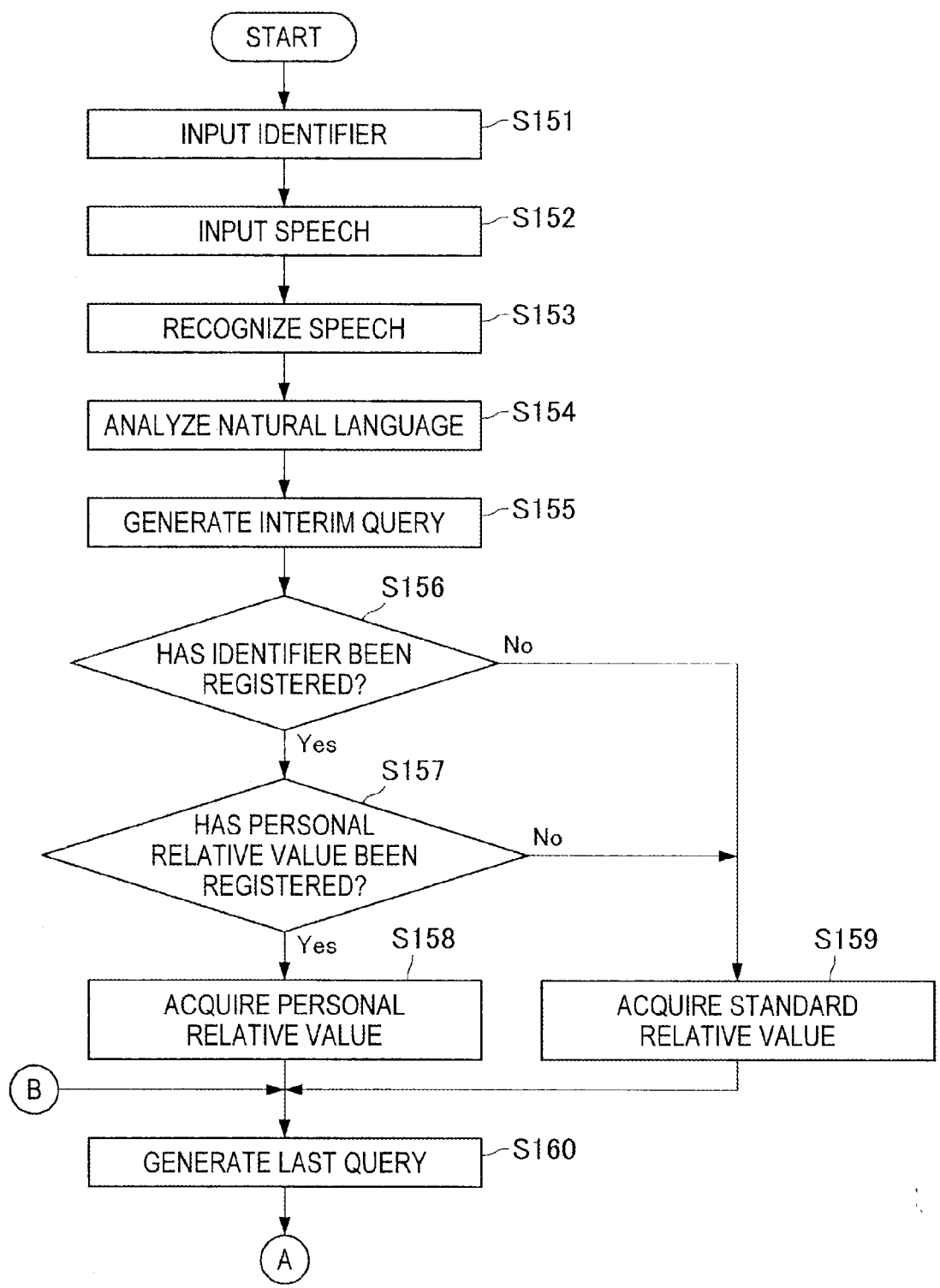
FIG. 19 is an illustrative diagram illustrating a flow of a process performed to realize the information search method according to the second variant of the embodiment.
Figure 20:
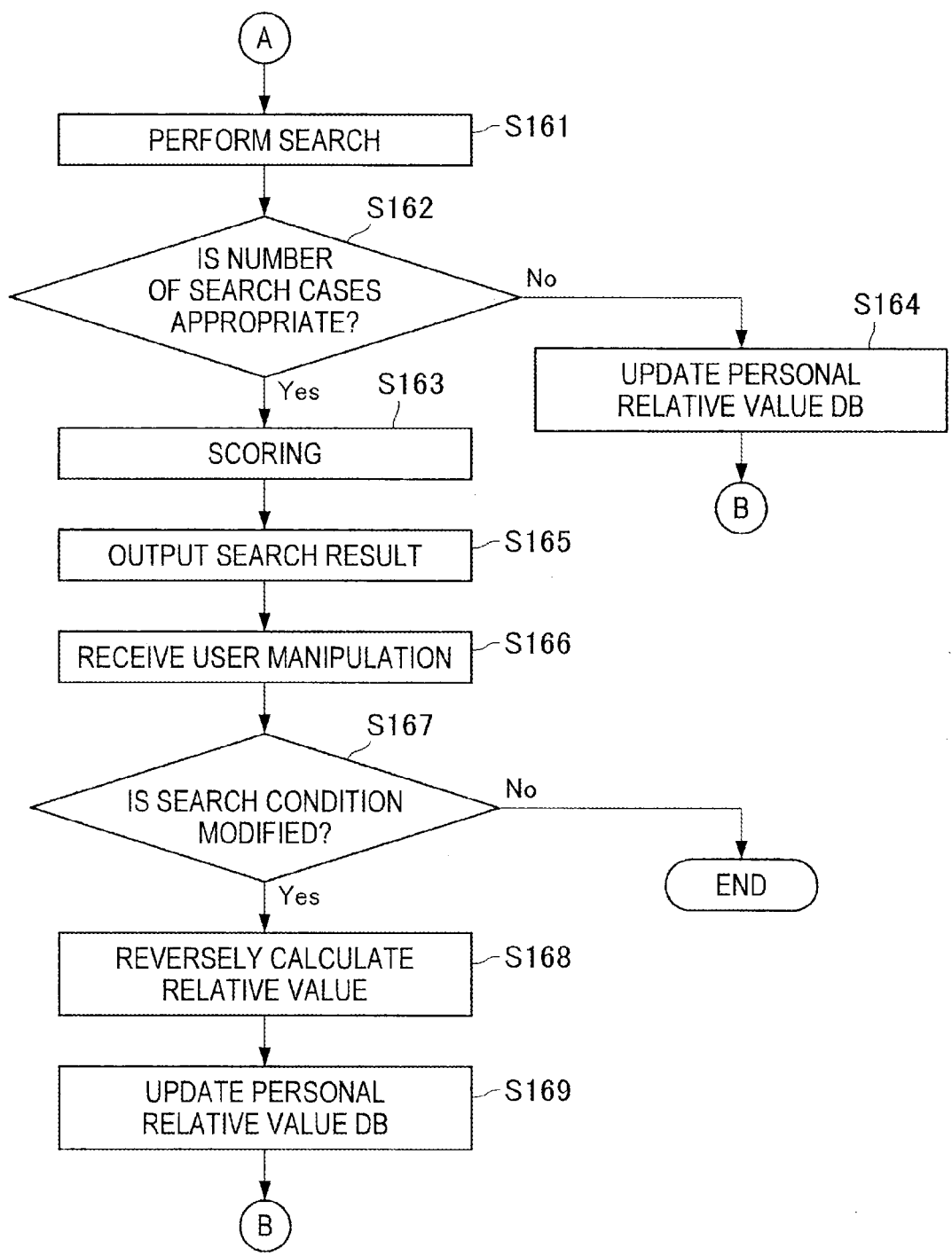
FIG. 20 is an illustrative diagram illustrating a flow of a process performed to realize the information search method according to the second variant of the embodiment.

Next, an information search method according to a second variant of the present embodiment will be described with reference to FIGS. 19 and 20. FIGS. 19 and 20 are flowcharts showing a flow of a process in an information search method according to the second variant of the present embodiment.

First, refer to FIG. 19. First, an identifier (user ID) for identifying a user is input, as shown in FIG. 19 (S151). Next, a search condition is input through speech by the user (S152). If the search condition is input through speech by the user, the search apparatus 150 converts the input speech into text using the function of the speech recognition unit 101 (S153). The search apparatus 150 then analyzes the search condition (natural sentence) converted into the text using the function of the natural language analysis unit 102 (S154). The search apparatus 150 then combines elements of the natural sentence obtained by the analysis of step S154 to generate an interim query using the function of the query generation unit 104 (S155). In this case, the query generation unit 104 combines the elements of the natural sentence other than a subjective representation to be converted into a numerical range to generate an interim query.

Next, the search apparatus 150 performs a search based on the interim query to acquire a search result based on the interim query using the function of the content search unit 106. The search apparatus 150 then confirms whether the identifier has been registered in the personal relative value database 110 using the function of the digitizing unit 151 (S156). If the identifier has been registered, the process in the search apparatus 150 proceeds to step S157. On the other hand, if the identifier has not been registered, the process in the search apparatus 150 proceeds to step S159.

If the process proceeds to step S157, the search apparatus 150 confirms whether a record corresponding to a subjective representation to be converted into a numerical range has been registered in the personal relative value database 110 using the function of the digitizing unit 151 (S157). If the record has been registered in the personal relative value database 110, the process in the search apparatus 150 proceeds to step S158. On the other hand, if the record has not been registered in the personal relative value database 110, the process in the search apparatus 150 proceeds to step S159.

If the process proceeds to step S158, the search apparatus 150 acquires the relative value from the personal relative value database 110 using the function of the digitizing unit 151 (S158). Meanwhile, if the process proceeds to step S159, the search apparatus 150 acquires a relative value corresponding to the subjective representation from the standard relative value database 109 using the function of the digitizing unit 151 (S159). The search apparatus 150 having acquired the relative value acquires a distribution of the numerical range from the search result based on the interim query and determines a numerical range corresponding to the relative value based on the distribution using the function of the digitizing unit 151. The search apparatus 150 generates a last query with the determined numerical range added to a search condition using the function of the query generation unit 104 (S160), and the process proceeds to step A.

Next, refer to FIG. 20. As shown in FIG. 20, the search apparatus 150 in which the process has proceeded to step A performs a search based on the last query generated in step S160 using the function of the content search unit 106 (S161). The search apparatus 150 then judges whether the number of search results is suitable using the function of the digitizing unit 151 (S162). If the number of search results is suitable, the process in the search apparatus 150 proceeds to step S163. On the other hand, if the number of search results is not suitable, the process in the search apparatus 150 proceeds to step S164.

If the process proceeds to step S163, the search apparatus 150 scores the search result using the function of the digitizing unit 151 (S163), and the process proceeds to step S165. Meanwhile, if the process proceeds to step S164, the search apparatus 150 adjusts the relative value based on the weight and updates the personal relative value database 110 using the function of the digitizing unit 151 (S164). The process in the search apparatus 150 which has ended the process of step S164 proceeds to step B. That is, the process in the search apparatus 150 returns to step S160 shown in FIG. 19 and the search apparatus 150 performs the process from step S160 again.

The search apparatus 150 in which the process has proceeded to step S165 outputs the search result based on the last query using the function of the search information output unit 111 (S165). Further, the search apparatus 150 displays search conditions contained in the last query and an interface for modifying the search conditions to receive a user manipulation using the function of the search information output unit 111 (S166). The search apparatus 150 then judges whether a search condition has been modified by the user (S167).

If the search condition has been modified, the process in the search apparatus 150 proceeds to step S168. On the other hand, if the search condition has not been modified, the search apparatus 150 ends the series of processes. If the process proceeds to step S168, the search apparatus 150 calculates a relative value from the modified numerical range using the function of the relative value reverse calculation unit 113 (S168). In this case, the relative value reverse calculation unit 113 calculates the relative value based on the interim query using the distribution acquired from the search result. The search apparatus 150 then updates the personal relative value database 110 with the relative value calculated in step S168 using the function of the relative value reverse calculation unit 113 (S169).

The process in the search apparatus 150 that has ended the process in step S169 proceeds to step B. That is, the process in the search apparatus 150 returns to the step S160 shown in FIG. 19 and performs the process from step S160 again. The search apparatus 150 iteratively performs the process of steps S160 to S169 until the search condition modification by the user is completed, and ends the series of processes after the search condition modification ends. Further, if a plurality of subjective representations are contained in a natural sentence input as a search condition, the process from step S155 is performed on each subjective representation.

The information search method according to the second variant of the present embodiment has been described above.

5: Third Variant

In some cases, a subjective representation in a search condition input by a user may be ambiguous, and the search apparatus may perform processing to disambiguate the intended search condition. For example, a user's subjective representation "cheap" may mean either "inexpensive" or "low quality." In some embodiments, the search apparatus may use a thesaurus or other database of word meanings or associations to determine that the user's subjective representation is ambiguous. In this case, the search apparatus may prompt the user to disambiguate the search condition. For example, in some embodiments the search apparatus may present the user with a number of options (e.g., "inexpensive" and "low quality"), and allow the user to select the one that best corresponds to the intended meaning of the subjective representation.

6: Hardware Configuration

Figure 21:
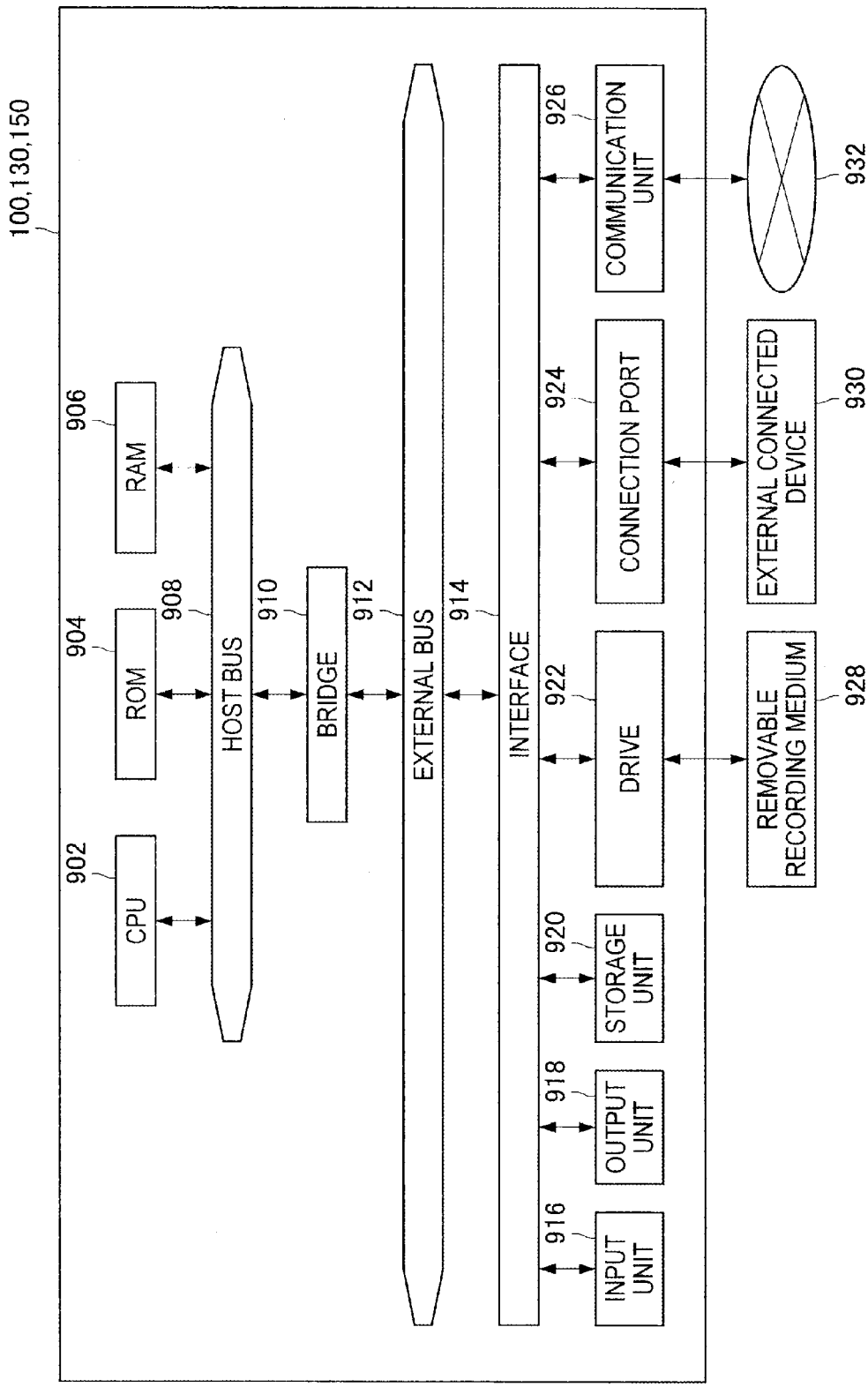
FIG. 21 is an illustrative diagram illustrating a hardware configuration of an information processing apparatus capable of realizing a function of the search apparatus according to the embodiment.

The function of each structural element of the search apparatus 100, 130 and 150 described above can be performed by using, for example, the hardware configuration of the information processing apparatus shown in FIG. 21. That is, the function of each structural element can be realized by controlling the hardware shown in FIG. 21 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 21, this hardware mainly includes at least one processor such as a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a modem for various types of communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

Some embodiments may comprise a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

7: Summary

Finally, content of the technique according to the embodiment of the present disclosure will be simply summarized. The content of the technique described herein may be applied, for example, to several information processing apparatuses such as a PC, a portable telephone, a portable game machine, a personal digital assistant, an information appliance, and a car navigation system.

A functional configuration of the information processing apparatus may be represented as follows. The information processing apparatus includes the following interim search unit, the distribution acquisition unit, the numerical range selection unit, and the present search unit. If a natural sentence containing a subjective representation to be converted into a numerical range is input, the interim search unit performs a search using elements other than the subjective representation among the elements constituting the natural sentence as search conditions. For example, if a natural sentence, "Show me an inexpensive sushi restaurant in Ginza," is input, a subjective representation to be converted into a numerical range is an element, "inexpensive," indicating a price range.

It is difficult for a numerical range tried to be represented using such a subjective representation by a user to be uniquely determined based on only the subjective representation. That is, it is difficult to judge whether a price range indicated by a subjective representation "inexpensive" is 0 to 3000 yen or 0 to 6000 yen. The interim search unit provisionally searches information using the elements of the natural sentence other than this subjective representation. Using this interim search, information indicating a situation considered to be a prerequisite by the user can be collected. For example, information on "a sushi restaurant in Ginza" can be collected. Using this information, for example, market outlook of user can be predicted.

The distribution acquisition unit acquires a distribution of a numerical value corresponding to the subjective representation with respect to the search result of the interim search unit. Based on the above example, this distribution acquisition unit acquires the distribution of the price range from information collected about "a sushi restaurant in Ginza." If the distribution of the price range can be acquired, "expensive sushi restaurant" and "inexpensive sushi restaurant" among "sushi restaurants in Ginza" can be identified. For example, a "sushi restaurant" corresponding to X percent in order from low price may be judged to be "inexpensive sushi restaurant with." However, X is a value to be determined by the user in advance. Further, if "inexpensive sushi restaurant" can be identified, a price range of "inexpensive sushi restaurant" can be conversely obtained.

The numerical range selection unit selects a numerical range from the distribution of the numerical value acquired by the distribution acquisition unit based on the relative value associated with the subjective representation in advance. This relative value is a numerical value corresponding to X. As described above, since the distribution of the numerical value can be obtained from the information acquired by the interim search, the numerical range indicated by the subjective representation can be selected using the distribution of the numerical value and the relative value. For example, this numerical range selection unit may select a price range (e.g., 0 to 5000 yen) corresponding to a "sushi restaurant" corresponding to upper X percent with a low price range among "sushi restaurants in Ginza." The price range selected herein is one reflecting the market price of a "sushi restaurant in Ginza" and satisfies a criterion of "inexpensive" (X percent) thought by the user.

The present search unit performs a search using elements other than the subjective representation among elements constituting a natural sentence, and the numerical range selected by the numerical range selection unit as search conditions. Since the subjective representation is automatically converted into the numerical range as described above, a search result suitable for the numerical range can be correctly obtained.

Further, since the relative value is used when the numerical range is selected, for example, a price range suitable for market price of a "sushi restaurant in Ginza" is used as a search condition and an appropriate search result desired by the user is obtained. If the search condition is changed into "an inexpensive sushi restaurant in Shibuya," a price range suitable for market price of a "sushi restaurant in Shibuya" is used as a search condition. Thus, if the information processing apparatus is used, a search condition having reflected a situation assumed as a prerequisite by the user is automatically generated and an appropriate search result is obtained based on the search condition.

Further, in the case of a general information search system in which a subjective representation "inexpensive" is associated with a numerical range "0 to 6000 yen" and a subjective representation contained in the natural sentence is substituted with a numerical range to perform a search, an appropriate search result is accidentally obtained for "an inexpensive sushi restaurant in Ginza," but an appropriate search result is not obtained for "an inexpensive sushi restaurant in Shibuya." The information processing apparatus is capable of appropriately resolving such a problem. Further, the information processing apparatus can adaptively cope with a difference between any elements that are objects of the subjective representation, as well as a place difference. For example, a price range having reflected market price of "sushi restaurant in Ginza" is a search condition for an input "an inexpensive sushi restaurant in Ginza," while a price range having reflected market price of "steakhouse in Ginza" is a search condition for an input "inexpensive steakhouse in Ginza."

Thus, if the technique according to the present embodiment is applied, the subjective representation can be substituted with an appropriate numerical range in a situation determined by elements of a natural sentence other than subjective representations. As a result, it is possible to appropriately reflect a user's subjectivity varying with a situation in the search conditions and provide search results desired by the user.

Further, since a combination of each element as an object of a subjective representation such as "Ginza" and "sushi restaurant" and each subjective representation need not be associated with the numerical range individually and the subjective representation is associated with the relative value, an information amount to be held by the information processing apparatus is small. Further, as the information amount that is a search target is small, search efficiency is improved. Such an effect is not obtained by applying the functions of the interim search unit, the distribution acquisition unit, the numerical range selection unit, and the present search unit.

(Remarks)

The query generation unit 104 and the content search unit 106 are examples of the interim search unit and the present search unit. The digitizing units 108, 131 and 151 are examples of the distribution acquisition unit and the numerical range selection unit. The search information output unit 111 is an example of the output unit. The personal relative value database 110 is an example of the relative value holding unit and the element-specific relative value holding unit. The speech recognition unit 101 is an example of the speech/text conversion unit. The query generation unit 104 is an example of the subjective representation extraction unit. The digitizing unit 131 is an example of the clustering unit. The digitizing unit 151 is an example of the weight setting unit and the relative value adjustment unit.

It should be understood by those skilled in the art that various modifications, combinations, sub-combinations and alterations may occur depending on design requirements and other factors insofar as they are within the scope of the appended claims or the equivalents thereof.

For example, the present technology can adopt the following configurations.

(1) A search apparatus comprising:

an interim search unit for performing a search using elements other than a subjective representation to be converted into a numerical range among elements constituting a natural sentence as search conditions if the natural sentence containing the subjective representation is input;

a distribution acquisition unit for acquiring a distribution of a numerical value corresponding to the subjective representation with respect to a search result of the interim search unit;

a numerical range selection unit for selecting a numerical range from the distribution of the numerical value acquired by the distribution acquisition unit based on a relative value associated with the subjective representation in advance; and a present search unit for performing a search using the elements other than the subjective representation among the elements constituting the natural sentence and the numerical range selected by the numerical range selection unit as search conditions.

(2) The search apparatus according to the (1), further comprising:

an output unit for outputting at least the numerical range selected by the numerical range selection unit; and an input unit for changing a numerical range contained in a condition of the search by the present search unit.

(3) The search apparatus according to the (2), further comprising:

a relative value reverse calculation unit for calculating a relative value corresponding to the changed numerical range based on the distribution of the numerical value acquired by the distribution acquisition unit if the numerical range is changed through the input unit; and a relative value holding unit for holding the relative value calculated by the relative value reverse calculation unit to be associated with the subjective representation.

(4) The search apparatus according to the (3), wherein the numerical range selection unit confirms whether the relative value corresponding to the subjective representation has been held by the relative value holding unit, and selects the numerical range based on the relative value held by the relative value holding unit if the relative value corresponding to the subjective representation has been held.

(5) The search apparatus according to any one of the (1) to (4), further comprising:

a speech input unit for inputting the natural sentence through speech; and a speech/text conversion unit for converting the speech input to the speech input unit into text.

(6) The search apparatus according to any one of the (1) to (5), further comprising:

a natural language analysis unit for extracting individual elements constituting the natural sentence through natural language analysis; and a subjective representation extraction unit for comparing the individual elements extracted by the natural language analysis unit with a given subjective representation to be converted into a numerical range, and extracting the subjective representation contained in the natural sentence, wherein the interim search unit and the present search unit set conditions of search using the element extracted by the natural language analysis unit and the subjective representation extracted by the subjective representation extraction unit.

(7) The search apparatus according to any one of the (2) to (6), further comprising:

an element-specific relative value holding unit for extracting an element that is an object of the subjective representation from among the elements constituting the natural sentence and holding the extracted element to be associated with the relative value calculated by the relative value reverse calculation unit if the numerical range is changed through the input unit; and a clustering unit for clustering elements having a similar concept with respect to the element held by the element-specific relative value holding unit and associating each cluster with a relative value, wherein the numerical range selection unit extracts an element that is an object of the subjective representation from among the elements constituting the natural sentence, and selects the numerical range based on a relative value corresponding to a cluster having a similar concept to the extracted element.

(8) The search apparatus according to any one of the (1) to (7), further comprising:

a weight setting unit for setting a weight for a subjective representation corresponding to the numerical range according to a change frequency of the numerical range; and a relative value adjustment unit for adjusting a relative value corresponding to a numerical range contained in a condition of the search by the present search unit based on the weight set by the weight setting unit if the number of results of the search by the present search unit is smaller than a first given number or greater than a second given number.

(9) A search method in a search apparatus, comprising:

performing a search using elements other than a subjective representation to be converted into a numerical range among elements constituting a natural sentence as search conditions if the natural sentence containing the subjective representation is input;

acquiring a distribution of a numerical value corresponding to the subjective representation with respect to a result of the search in the interim search step;

selecting a numerical range from the distribution of the numerical value acquired in the distribution acquisition step based on a relative value associated with the subjective representation in advance; and performing a search using the elements other than the subjective representation among the elements constituting the natural sentence and the numerical range selected in the numerical range selection step as search conditions.

(10) A program for causing a computer to realize:

an interim search function of performing a search using elements other than a subjective representation to be converted into a numerical range among elements constituting a natural sentence as search conditions if the natural sentence containing the subjective representation is input;

a distribution acquisition function of acquiring a distribution of a numerical value corresponding to the subjective representation with respect to a result of the search through the interim search function;

a numerical range selection function of selecting a numerical range from the distribution of the numerical value acquired through the distribution acquisition function based on a relative value associated with the subjective representation in advance; and a present search function of performing a search using the elements other than the subjective representation among the elements constituting the natural sentence and the numerical range selected through the numerical range selection function as search conditions.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein is meant to encompass the items listed thereafter and equivalents thereof as well as additional items.

The present disclosure contains subject matter related to that disclosed in Japanese Priority Patent Application JP 2011-003005 filed in the Japan Patent Office on Jan. 11, 2011, the entire content of which is hereby incorporated by reference.

What is claimed is:

1. Apparatus comprising:
at least one processor; and
at least one memory storing processor-executable instructions configured to cause the at least one processor to:
receive a search query;
identify in the search query one or more subjective elements and one or more objective elements, the identifying comprising distinguishing between the one or more subjective elements and the one or more objective elements, wherein a first subjective element of the one or more subjective elements corresponds to different numerical ranges in the context of different objective elements;
perform a first search for content based on the one or more objective elements;
determine a distribution of a numerical characteristic of results returned from the first search, the numerical characteristic corresponding to the first subjective element of the one or more subjective elements;

determine one or more proportional thresholds for the first subjective element;

select a range of the numerical characteristic by applying the one or more proportional thresholds to the distribution; and perform a second search for content based at least in part on the selected range of the numerical characteristic;

wherein the search query comprises a natural language query provided by a user, wherein the first subjective element comprises one or more words in the natural language query, and wherein the processor-executable instructions are further configured to cause the at least one processor to perform natural language analysis on the natural language query to identify the one or more objective elements for the first search.

2. The apparatus of claim 1, wherein determining the one or more proportional thresholds comprises accessing a database associating the one or more proportional thresholds with the first subjective element.

3. The apparatus of claim 1, wherein determining the one or more proportional thresholds comprises receiving user input specifying the one or more proportional thresholds for the first subjective element.

4. The apparatus of claim 3, wherein the processor-executable instructions are further configured to cause the at least one processor to store the one or more proportional thresholds specified by the user in a database of proportional thresholds associated with the user.

5. The apparatus of claim 1, wherein the processor-executable instructions are further configured to cause the at least one processor to:

receive user input to modify the selected range of the numerical characteristic; and perform a third search for content based on the modified range of the numerical characteristic.

6. A method comprising:

receiving a search query;

identifying in the search query one or more subjective elements and one or more objective elements, the identifying comprising distinguishing between the one or more subjective elements and the one or more objective elements, wherein a first subjective element of the one or more subjective elements corresponds to different numerical ranges in the context of different objective elements;

performing a first search for content based on the one or more objective elements;

determining, using at least one processor, a distribution of a numerical characteristic of results returned from the first search, the numerical characteristic corresponding to the first subjective element of the one or more subjective elements;

determining one or more proportional thresholds for the first subjective element;

selecting a range of the numerical characteristic by applying the one or more proportional thresholds to the distribution; and performing a second search for content based at least in part on the selected range of the numerical characteristic;

wherein the search query comprises a natural language query provided by a user, wherein the first subjective element comprises one or more words in the natural language query, and wherein the method comprises performing natural language analysis on the natural language query to identify the one or more objective elements for the first search.

7. The method of claim 6, wherein determining the one or more proportional thresholds comprises accessing a database associating the one or more proportional thresholds with the first subjective element.

8. The method of claim 6, wherein determining the one or more proportional thresholds comprises receiving user input specifying the one or more proportional thresholds for the first subjective element.

9. The method of claim 8, further comprising storing the one or more proportional thresholds specified by the user in a database of proportional thresholds associated with the user.

10. The method of claim 6, further comprising:

receiving user input to modify the selected range of the numerical characteristic; and performing a third search for content based on the modified range of the numerical characteristic.

11. At least one computer-readable storage medium encoded with computer-executable instructions that, when executed, perform a method comprising:

receiving a search query;

identifying in the search query one or more subjective elements and one or more objective elements, the identifying comprising distinguishing between the one or more subjective elements and the one or more objective elements, wherein a first subjective element of the one or more subjective elements corresponds to different numerical ranges in the context of different objective elements;

performing a first search for content based on the one or more objective elements;

determining a distribution of a numerical characteristic of results returned from the first search, the numerical characteristic corresponding to the first subjective element of the one or more subjective elements;

determining one or more proportional thresholds for the first subjective element;

selecting a range of the numerical characteristic by applying the one or more proportional thresholds to the distribution; and performing a second search for content based at least in part on the selected range of the numerical characteristic;

wherein the search query comprises a natural language query provided by a user, wherein the first subjective element comprises one or more words in the natural language query, and wherein the method comprises performing natural language analysis on the natural language query to identify the one or more objective elements for the first search.

12. The at least one computer-readable storage medium of claim 11, wherein determining the one or more proportional thresholds comprises accessing a database associating the one or more proportional thresholds with the first subjective element.

13. The at least one computer-readable storage medium of claim 11, wherein determining the one or more proportional thresholds comprises receiving user input specifying the one or more proportional thresholds for the first subjective element.

14. The at least one computer-readable storage medium of claim 13, wherein the method further comprises storing the one or more proportional thresholds specified by the user in a database of proportional thresholds associated with the user.

15. The at least one computer-readable storage medium of claim 11, wherein the method further comprises:

receiving user input to modify the selected range of the numerical characteristic; and performing a third search for content based on the modified range of the numerical characteristic.

16. Apparatus comprising:
means for receiving a search query;
means for identifying in the search query one or more subjective elements and one or more objective elements, the identifying comprising distinguishing between the one or more subjective elements and the one or more objective elements, wherein a first subjective element of the one or more subjective elements corresponds to different numerical ranges in the context of different objective elements;
means for performing a first search for content based on the one or more objective elements;
means for determining a distribution of a numerical characteristic of results returned from the first search, the numerical characteristic corresponding to the first subjective element of the one or more subjective elements;
means for determining one or more proportional thresholds for the first subjective element;
means for selecting a range of the numerical characteristic by applying the one or more proportional thresholds to the distribution; and
means for performing a second search for content based at least in part on the selected range of the numerical characteristic;
wherein the search query comprises a natural language query provided by a user, wherein the first subjective element comprises one or more words in the natural language query, and wherein the means for identifying is for performing natural language analysis on the natural language query to identify the one or more objective elements for the first search.

* * * * *